US009390511B2

(12) United States Patent
Ehmann

(10) Patent No.: US 9,390,511 B2
(45) Date of Patent: Jul. 12, 2016

(54) TEMPORALLY COHERENT SEGMENTATION OF RGBT VOLUMES WITH AID OF NOISY OR INCOMPLETE AUXILIARY DATA

(71) Applicant: FUTUREWEI TECHNOLOGIES, INC., Plano, TX (US)

(72) Inventor: Jana Ehmann, San Francisco, CA (US)

(73) Assignee: Futurewei Technologies, Inc., Plano, TX (US)

( * ) Notice: Subject to any disclaimer, the term of this patent is extended or adjusted under 35 U.S.C. 154(b) by 104 days.

(21) Appl. No.: 14/466,827

(22) Filed: Aug. 22, 2014

(65) Prior Publication Data

US 2015/0054974 A1 Feb. 26, 2015

Related U.S. Application Data

(60) Provisional application No. 61/869,574, filed on Aug. 23, 2013.

(51) Int. Cl.
*H04N 5/225* (2006.01)
*G06T 7/00* (2006.01)
*H04N 5/222* (2006.01)
*H04N 9/75* (2006.01)

(52) U.S. Cl.
CPC ............ *G06T 7/0081* (2013.01); *G06T 7/0097* (2013.01); *H04N 5/2226* (2013.01); *H04N 9/75* (2013.01); *G06T 2207/10016* (2013.01); *G06T 2207/10024* (2013.01); *G06T 2207/10028* (2013.01); *G06T 2207/10048* (2013.01); *G06T 2207/20144* (2013.01); *G06T 2207/30196* (2013.01)

(58) Field of Classification Search
CPC .............. G06T 7/0081; G06T 7/0097; G06T 2207/10028; G06T 2207/10048; G06T 2207/10016; G06T 2207/10024; G06T 2207/30196; G06T 2207/20144; H04N 5/2226; H04N 9/75
See application file for complete search history.

(56) References Cited

U.S. PATENT DOCUMENTS

2008/0316327 A1* 12/2008 Steinberg ........... G06K 9/00248
348/222.1
2012/0051631 A1* 3/2012 Nguyen ................... G06K 9/38
382/164

* cited by examiner

*Primary Examiner* — Twyler Haskins
*Assistant Examiner* — Padma Haliyur
(74) *Attorney, Agent, or Firm* — Conley Rose, P.C.; Grant Rodolph; Jonathan K. Polk

(57) ABSTRACT

An apparatus for performing video segmentation, including image sensors of a first type, auxiliary sensors of a second type, and a processor executing computer-executable instructions stored in memory. The instructions include capturing RGB image video data from a plurality of first image sensors; capturing second video data from a plurality of second, auxiliary sensors; for a reference frame, determining an initial segmentation map by segmenting a first object-of-interest from a background from said second video data; determining a history of segmentation information on a pixel-by-pixel basis, wherein a length of said history is based on motion data for the object-of-interest; generating a refined segmentation map by refining on a pixel-by-pixel basis a corresponding value of said initial segmentation map based on said history of segmentation information; and performing RGB segmentation on a corresponding reference frame of said RGB image video based on said refined segmentation map.

18 Claims, 17 Drawing Sheets

TEMPORALLY COHERENT SEGMENTATION OF RGBT VOLUMES WITH AID OF NOISY OR INCOMPLETE AUXILIARY DATA

CROSS REFERENCE TO RELATED APPLICATIONS

The present application claims priority to and the benefit of the commonly owned, provisional patent application, U.S. Ser. No. 61/869,574, entitled "TEMPORALLY COHERENT SEGMENTATION OF RGBt VOLUMES WITH AID OF NOISY OR INCOMPLETE AUXILIARY DATA," with filing date Aug. 23, 2013, which is herein incorporated by reference in its entirety.

BACKGROUND

Video segmentation, or segmentation of RGBt volumes, has many applications that include but are not limited to security, data summarization, entertainment, video conferencing etc. Real-time and fast video processing is often a requirement for such algorithms, which puts constraints on their complexity. For applications where the results are directly presented to human observers, segmentation algorithms have additional performance requirements, since humans are very sensitive to visual artifacts like noisy boundaries and flickering, as well as semantics-related errors such as missed parts of semantically consistent entities and objects.

The accent is on immersive experiences when implementing these human observer-targeted applications, where the subjects are extracted from their surroundings and placed on virtual backgrounds, either for entertainment purposes, or for remote communication and collaboration. In order for such applications to be truly immersive and functional, the segmentation of users and other objects of interest in the local scene has to be done in real time. Furthermore, segmentation boundaries should be precise and the extracted RGBt volumes should be smooth, coherent and semantically cohesive, to provide a pleasant viewing experience.

However, traditional segmentation processes used within these immersive applications do not perform consistently under certain conditions typical of one or more image backgrounds. For instance in a video-conferencing scenario, one or more participants may reside in multiple environments, are segmented from their respective surrounding environments or backgrounds, and placed on virtual backgrounds for viewing by the other participants. Typically, when performing segmentation procedures using only in the red, green, and blue (RGB) domain, extraction of a subject from their respective background environment makes assumptions that severely limit their performance. These assumptions either impose a static, non-changing background, or require the background to follow a limited, statistical model to distinguishing a background from a foreground. As a result, these processes have trouble performing segmentation in common environments resulting in missing parts of the subject. For example, some common environments that provide segmentation problems may include a dynamically changing street environments in the background, an environment that closely matches clothes on a subject; and where shadows weaken edge boundaries between a subject and background.

What is desired is a segmentation process that reduces segmentation errors and unwanted artifacts, such as, flickering, non-smooth boundaries, and the omission of areas of an object-of interest.

BRIEF DESCRIPTION OF THE DRAWINGS

Further aspects of the present invention will become apparent from the following description which is given by way of example only and with reference to the accompanying drawings in which.

SUMMARY

Figure 1:
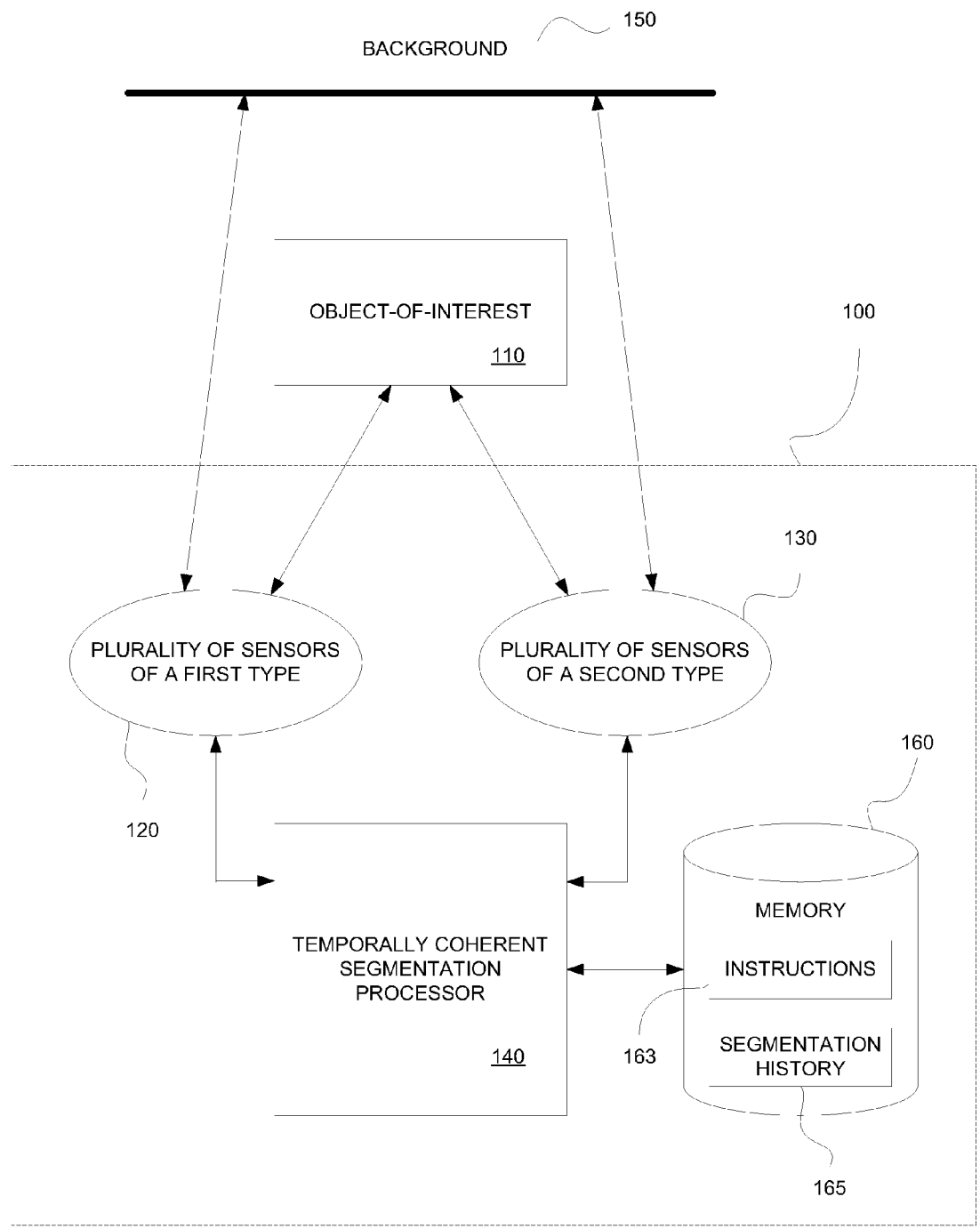
FIG. 1 is a block diagram of an apparatus configured for performing video segmentation by refining the segmentation of objects obtained from auxiliary sensors, such as, depth sensors, by considering historical segmentation values and motion, and using an initial segmentation map generated from these auxiliary sensors to generate a final RGB segmentation map, in accordance with one embodiment of the present disclosure.

A system for performing video segmentation is disclosed, and includes a plurality of image sensors of a first type (e.g., RGB sensor), a plurality of auxiliary sensors of a second type (e.g., depth sensor), and a processor executing computer-executable instructions stored in memory. The processor executed instructions include capturing RGB image video data from a plurality of image sensors of a first type; capturing second video data from a plurality of second, auxiliary sensors of a second type; for a reference frame, determining an initial segmentation map by segmenting a first object-of-interest from a background from the second video data; determining a history of segmentation information on a pixel-by-pixel basis, wherein a length of the history is based on motion data for the object-of-interest (e.g., motion data for each pixel and/or an overall motion in the current frame); generating a refined segmentation map by refining on a pixel-by-pixel basis a corresponding value of the initial segmentation map based on the history of segmentation information; and performing RGB segmentation on a corresponding reference frame of the RGB image video based on the refined segmentation map.

In another embodiment, a method for performing video segmentation by refining the segmentation of objects from video by considering historical segmentation values and motion is disclosed. The method includes capturing RGB image video data from a plurality of image sensors of a first type (e.g., RGB sensors). The method includes capturing second video data from a plurality of second, auxiliary sensors of a second type (e.g., depth sensors). The method includes determining for a reference frame an initial segmentation map by segmenting a first object-of-interest from a background from the second video data. The method includes determining a history of segmentation information on a pixel-by-pixel basis, wherein a length of the history is based on motion data for the object-of-interest (e.g., motion data for each pixel and/or an overall motion in the current frame). The method includes generating a refined segmentation map by refining on a pixel-by-pixel basis a corresponding value of the initial segmentation map based on the history of segmentation information. The method includes performing RGB segmentation on a corresponding reference frame of the RGB image video based on the refined segmentation map.

In still another embodiment, a computer system for performing video segmentation is described, wherein the computer system includes memory having stored therein computer-executable instructions, and a processor executing the computer-executable instructions. The processor executed instructions include capturing RGB image video data from a plurality of image sensors of a first type; capturing second video data from a plurality of second, auxiliary sensors of a second type; for a reference frame, determining an initial segmentation map by segmenting a first object-of-interest from a background from the second video data; determining a history of segmentation information on a pixel-by-pixel basis, wherein a length of the history is based on motion data for the object-of-interest (e.g., motion data for each pixel and/or an overall motion in the current frame); generating a refined segmentation map by refining on a pixel-by-pixel basis a corresponding value of the initial segmentation map based on the history of segmentation information; and performing RGB segmentation on a corresponding reference frame of the RGB image video based on the refined segmentation map.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present invention provide for performing video segmentation including performing temporally coherent segmentation on segmentation maps generated from two different types of sensors, in accordance with one embodiment of the present disclosure. Other embodiments of the present invention provide the above advantages, and also provide for video segmentation systems and methods (e.g., as implemented across various human observer-targeted applications, such as, videoconferencing, tele-collaboration, and entertaining) that provide real-time, fast video processing, and also produce visually pleasing results including smooth, coherent, and semantically cohesive RGBt volumes, representing object-of-interest over a period of time. This is achieved by adding auxiliary data (e.g., depth maps, infrared information, thermal values, etc.) to the RGB values, wherein this additional information can significantly improve the results of video segmentation by facilitating object localization and speeding up the RGB-based segmentation process.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art.

A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "capturing," "determining," "refining, " "performing," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Flowcharts of examples of methods for providing video segmentation are described, according to embodiments of the present invention. Although specific steps are disclosed in the flowcharts, such steps are exemplary. That is, embodiments of the present invention are well-suited to performing various other steps or variations of the steps recited in the flowcharts.

FIG. 1 is a block diagram of an apparatus 100 configured for performing video segmentation by refining the segmentation of objects obtained from auxiliary sensors (e.g., depth sensors) by considering historical segmentation values and motion, and using an initial segmentation map generated from these auxiliary sensors to generate a final RGB segmentation map, in accordance with one embodiment of the present disclosure.

As shown, apparatus 100 is configured to capture video of various data types in order to segment an object-of-interest 110 from a background 150, in accordance with one embodiment of the present disclosure. In particular, apparatus 100 includes a plurality of image sensors 120 of a first type. For example, image sensors 120 can be camera image sensors (e.g., charge-coupled devices [CCD] and complementary metal-oxide semiconductor [CMOS] sensors) including a filter for registering color, such as, RGB (read, green, and blue), or CMYG (cyan, magenta, yellow, and green). For purposes of illustration only, embodiments of the present invention are described in this application, wherein the first type of image sensor is a RGB sensor, however, other embodiments are suitable for supporting other formats for the first type of image sensor.

Apparatus 100 also includes a plurality of second, auxiliary image sensors 130 of a second type. For example, image sensors 130 can be depth imaging sensors, infrared imaging sensors, thermal imaging sensors, time-of-flight sensors, etc. For purposes of illustration only, embodiments of the present invention are described in this application, wherein the second type of image sensor is a depth sensor, however, other embodiments are suitable for supporting other formats for the second type of image sensor.

Apparatus 100 also includes a processor 140 executing computer-executable instructions stored in memory 160, wherein the processor 140 is configured to perform temporally coherent segmentation on image data of one or more types. In one embodiment, processor 140 is configured to execute processes outlined in FIGS. 5B, and 8-13. In certain embodiments, processor 140 may receive instructions from a software application or hardware module. These instructions may cause processor 140 to perform the functions of one or more the example embodiments described and/or illustrated herein. Additionally or alternatively, the example embodiments described and/or illustrated herein may be implemented in firmware and/or hardware.

Processor 140 may be included within a single or multi-processor computing device or system capable of executing computer-readable instructions. Examples of computing devices or systems include, without limitation, workstations, laptops, client-side terminals, servers, distributed computing systems, handheld devices, or any other computing system or device. In its most basic form, a computing device may include at least one processor 140 and a system memory 160. System memory 160 is coupled to processor 140, and generally represents any type or form of volatile or non-volatile storage device or medium capable of storing data and/or other computer-readable instructions. Examples of system memory 160 include, without limitation, RAM, ROM, flash memory, or any other suitable memory device.

Embodiments of the present invention provide for adding auxiliary information (e.g., depth maps, infrared imaging, thermal imaging, time-of-flight imaging, etc.) obtained from the second sensors 130 of a second type to three-dimensional acquisition systems utilizing RGB imaging and segmentation. As a start, the auxiliary information has made the automatic detection and segmentation of humans viable in real-time, where the background is no longer the main limiting factor. In systems utilizing depth sensors, virtually all of the requirements imposed on the background by the RGB-based segmentation algorithms are removed, and the segmentation can be carried out more reliably and more quickly, even under conditions that would be normally adverse for RGB segmentation, such as dynamic backgrounds, rapid lighting changes, low color contrast etc. For example, this is accomplished by performing a fast object-of-interest detection and segmentation on the depth data, and then refining its results in the RGB domain.

However, merely providing for auxiliary information, such as commodity depth sensors, introduce new challenges when performing segmentation. In particular, the depth maps (and also data obtained from the sensors of a second type 130) contain noise, particularly around the boundary of an object-of-interest. Additionally, due to the acquisition mechanisms, the produced depth maps can contain a significant number of pixels with undefined values, where the depth cannot be determined reliably. as such, noise and undefined values are the two main reasons for segmentation errors.

Embodiments of the present invention minimize and/or remove the initial deviations from the true boundaries of humans and other objects-of-interest when generating an initial segmentation map that is then utilized when performing RGB segmentation. As such, embodiments of the present invention are able to minimize and/or remove the generation of unpleasant artifacts (e.g., flickering, non-smooth boundaries and omission of important parts of the body) due to noisy and incomplete mapping data obtained from the auxiliary data. That is, in embodiments of the present invention, the initial segmentation of the depth map minimizes noise and the effects of missing values, and generates an initial segmentation map that is as close as possible to the desired object boundaries.

Figure 2:
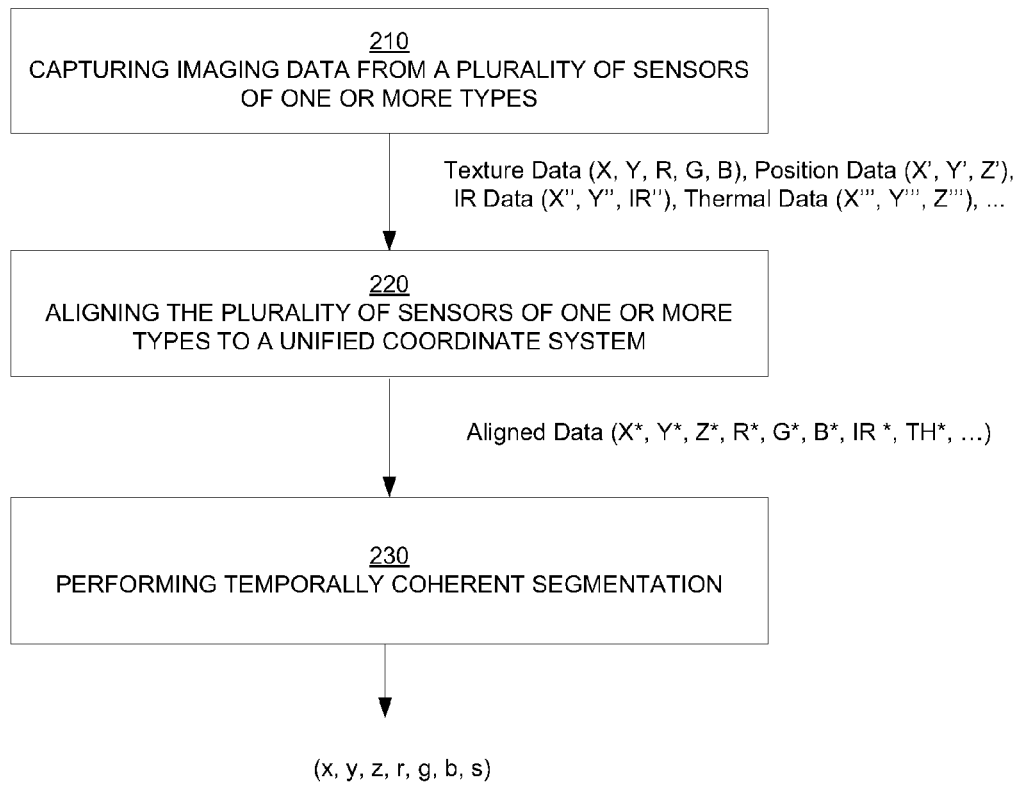
FIG. 2 is a flow chart illustrating steps in a method for performing temporally coherent segmentation of RGBt volumes, in accordance with one embodiment of the present disclosure.

FIG. 2 is a flow diagram 200 illustrating steps in a method for performing temporally coherent segmentation of RGBt volumes, in accordance with one embodiment of the present disclosure. In other embodiments, the method outlined in flow diagram 200 may be implemented as a computer-implemented method; or implemented as instructions within a computer system including a processor and memory configured to execute the instructions; or implemented as computer/processor executable instructions stored on a non-transitory computer-readable storage medium. The operations of flow diagram 200 can be implemented within apparatus 100 configured for performing video segmentation, in some embodiments of the present disclosure.

At 210, the method includes capturing image data from a plurality of sensors that can capture various information from the real world using various techniques. The sensors could include a first type, a second type, etc. For example, sensors can capture data of various formats, including color (RGB), depth, infrared reflections, thermal data, time-of-flight data, etc.

At a particular point in time $t_i$, a set of readings is collected from the different sensors in the form of data maps, where X and Y represent the spatial coordinates, and X, Y, R, G, B represents textural (image) data. For instance, one data map includes position data (e.g., X', Y', and Z'), another data map includes infrared data (e.g., X'', Y'', and Z''), another data map includes thermal data (X''', Y''', and Z'''). Additional data maps can be collected for increased accuracy.

At 220, the method includes aligning the plurality of sensors of one or more types, and the information collected from these systems, to a unified coordinate system. That is, these measurements obtained from different sensors do not necessarily, in their raw form, correspond to the same spatial coordinates. That is, it may be that $X \neq X' \neq X'' \neq X'''$ and $Y \neq Y' \neq Y'' \neq Y'''$. Thus, alignment is needed to map out the different measurements to one unified coordinate system, so that the information from different sensors can be combined and analyzed jointly. This requires a calibration process, which will provide the appropriate transformation matrices for each sensor's data for alignment with the reference coordinate system. In embodiments, that reference coordinate system may be the intrinsic coordinate system of one of the sensors, for example, the RGB camera, or it may be a new coordinate system that is not identical to any of the sensors' coordinate systems. After the alignment procedure, each point in the reference coordinate system should be properly associated with corresponding values from all the input sensors.

The alignment process can be described as a series of transforms applied to the raw sensor data in Equations 1-4, as follows:

$$(X^*, Y^*, R^*, G^*, B^*) = T_{rgb}(X, Y, R, G, B), \text{ for texture (image) data;} \quad (1)$$

$$(X^*, Y^*, Z^*) = T_z(X', Y', Z'), \text{ for depth data;} \quad (2)$$

$$(X^*, Y^*, IR^*) = T_{ir}(X'', Y'', IR''), \text{ for infrared data; and} \quad (3)$$

$$(X^*, Y^*, TH^*) = T_{th}(X''', Y''', TH'''), \text{ for thermal data.} \quad (4)$$

The transformations $T_{rgb}$, $T_z$, $T_{ir}$, and $T_{th}$ have been previously determined by registration procedures for every sensor separately. After the alignment procedure, each point in the referent coordinate system, described by $(X^*, Y^*)$, should have associated values from all the input sensors.

At 230, the method includes performing temporally coherent RGBt segmentation using the collection of measurements $(X^*, Y^*, Z^*, R^*, G^*, B^*, IR^*, TH^* \ldots)$. During segmentation, the input video is segmented using the auxiliary information, and yields a temporally coherent and smooth RGBt volume that contains the subjects and objects-of-interest. The final output, at a point in time, is a set of values (x, y, z, r, g, b, s), where (x, y, z) are the spatial coordinates, (r, g, b), is the texture (image) data, and s is the mask/segmentation map identifying the objects-of-interest in the scene. Values equal to "0" in the mask/segmentation map denote the background pixels, and integer values greater than "0" denote the pixels associated with objects-of-interest in the frames of the video. As such, to obtain the mask/segmentation map s, the goal is to decompose the capture and aligned data $(X^*, Y^*, Z^*, R^*, G^*, B^*, IR^*, TH^* \ldots)$, into background and objects of interest.

The data obtained from the sensors can be very noisy. In addition, there may be some missing values in the data maps, either due to the imperfections of the sensors, or as the result from aligning the data viewed from different points in space. For example, commodity depth sensors measure the depth by casting pseudo-random IR patterns into the space, capturing the IR reflections, and determining the depth values by analyzing the deformations of the recorded patterns. The output from these commodity depth sensors produce depth maps that often contain a significant amount of "holes" or "shadows." Those "holes" in the data are the locations where the depth cannot be determined and they can occur for various reasons. For these reasons, embodiments of the present invention perform video segmentation in two stages including performing temporally coherent segmentation of an initial segmentation map taken with second, auxiliary sensors, and using the initial segmentation map to perform temporally coherent segmentation of RGBt volumes.

Figure 3A:
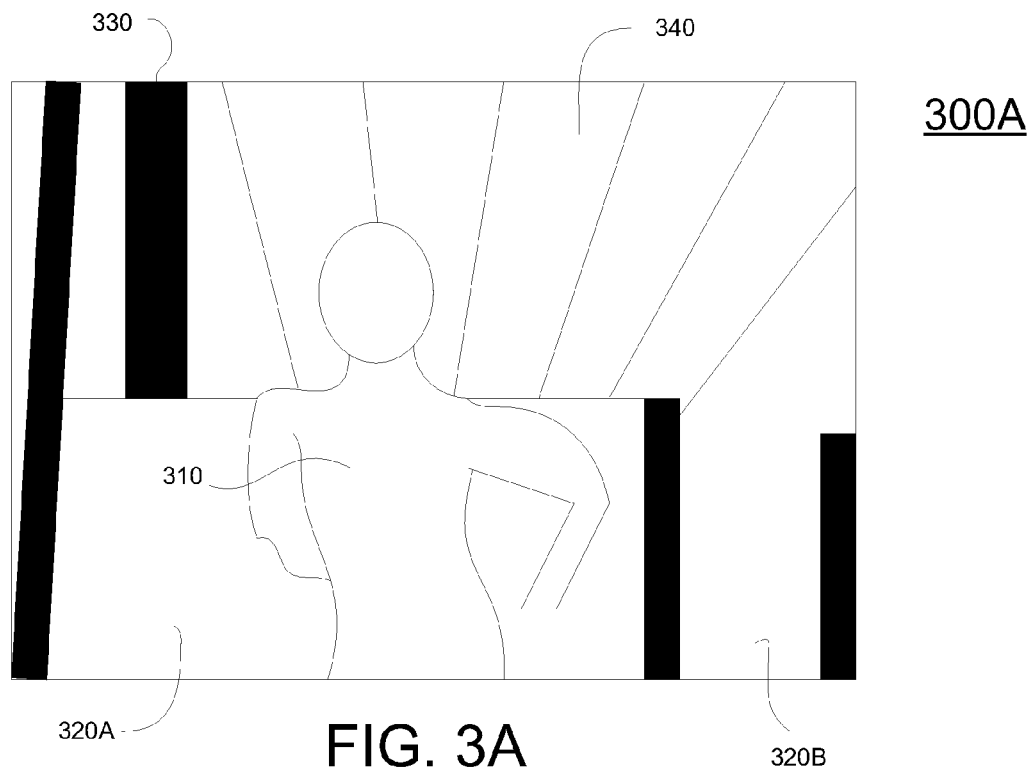
FIG. 3A is a rendering of an RGB image of an object-of-interest and a background used for performing temporally coherent segmentation of RGBt volumes, in accordance with one embodiment of the present disclosure.

FIG. 3A is a rendering of an RGB image 300A of an object-of-interest 310 (e.g., person) and a background used for performing temporally coherent segmentation of RGBt volumes, in accordance with one embodiment of the present disclosure. For example, RGB image 300A may be a typical output taken using an RGB camera. The object-of-interest 310 is standing within an environment, or background, wherein the background includes cubical paneling 320A-B, wall support, and a ceiling 340.

Figure 3B:
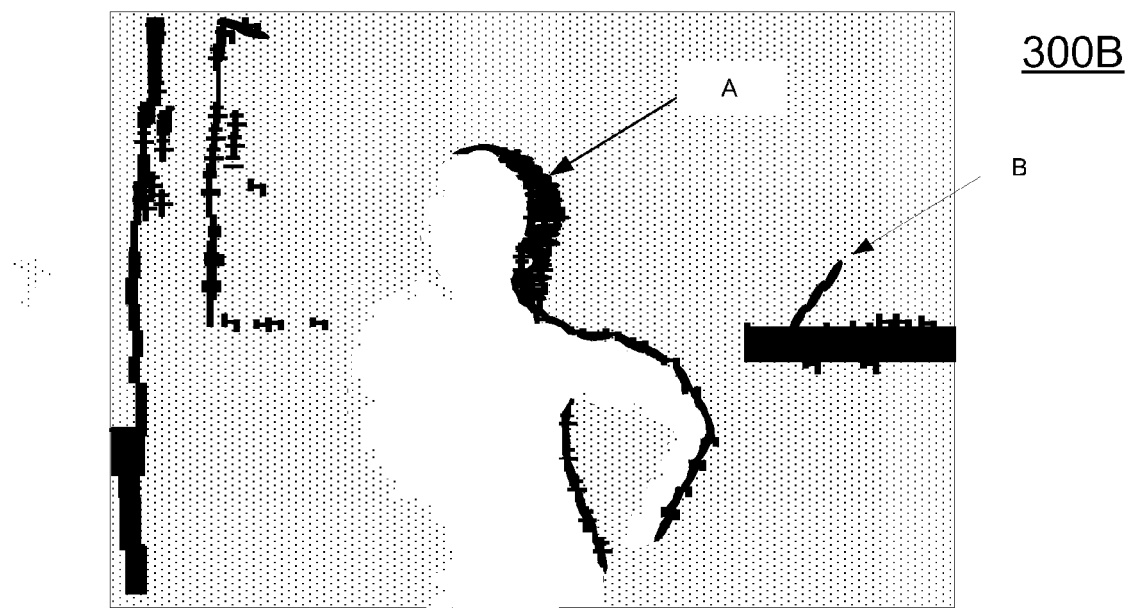
FIG. 3B is a rendering of a depth map including the object-of-interest shown in FIG. 3A and that is used for refining the segmentation of objects by considering of historical segmentation values and motion, in accordance with one embodiment of the present disclosure.

FIG. 3B is a rendering of a depth map 300B taken from depth map sensors including the object-of-interest 310 shown in image 300A of FIG. 3A, wherein the depth map 300B is used for refining the segmentation of objects by considering of historical segmentation values and motion, in accordance with one embodiment of the present disclosure. As shown in depth map 300B, the black regions represent the "holes," or missing values, in places at which the depth cannot be determined. In FIG. 3B, the black areas, or the missing depth values, can be noticed in places where there are IR reflective surfaces, such as a glass window or hair on the object-of-interest. For example, arrow A is pointing to missing depth values in the area of the head of the person as the object-of-interest. The black region highlighted by arrow A may correspond to hair of the object-of-interest. In addition, holes may also occur in the faraway regions which are beyond the sensor's range, such as the holes highlighted by arrow B.

Figure 4:
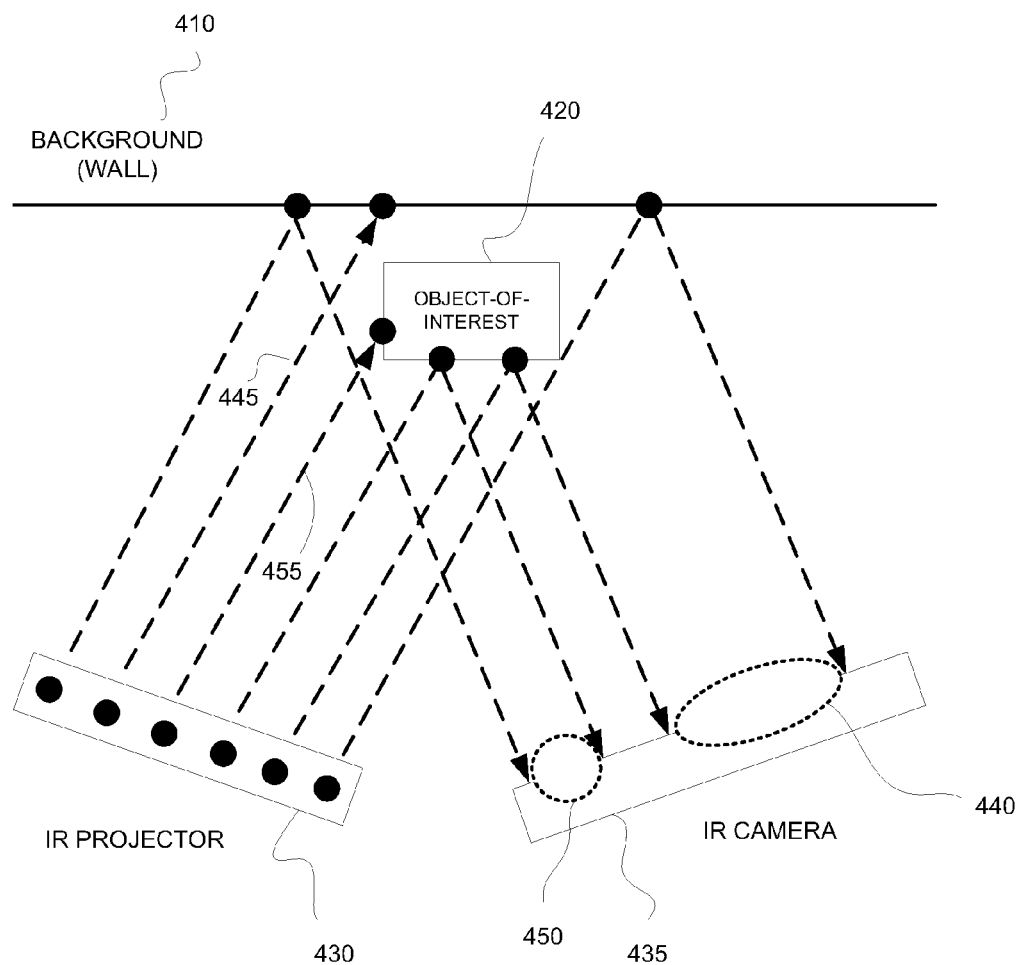
FIG. 4 is an illustration of parallax experienced between two different lines of sight corresponding to a source and a sensor.

The shadowy areas around the object-of-interest, where there are no valid depth values may be caused by the parallax between an energy source and the receiving sensor. For example, FIG. 4 is an illustration of parallax experienced between two different lines of sight corresponding to a depth sensor system including an IR projector 430, as the source, and an IR camera 440, as the receiving sensor, when viewing an object-of-interest 420 that is set against a background 410 (e.g., a wall). In particular, the two fields-of-view corresponding to the IR projector 430 and the IR camera 440 are not the same. For instance, different views of the object-of-interest 420 are presented to the IR projector 430 and the IR camera 440. As such, not all of the projected IR patterns (represented as dots) sourced from the IR projector 430 and projected onto the object-of-interest 420 and the background 410 are reflected and visible by the IR camera 440. This results in areas where the depth values cannot be estimated, as depicted by the highlighted hole regions 440 and 450 that occur around the boundary of the object-of-interest 420. For instance, hole region 440 is prevented from viewing at least ray 445, and hole region 450 is prevented from viewing at least ray 455, both of which causes missing values due to parallax. Thus, the output of the IR camera 435 (e.g., as a depth sensor) has two problems: noise and missing values. Embodiments of the present invention are able to minimize the noise and missing values when using auxiliary data (e.g., depth maps) for RGBt segmentation, as will be described more fully below.

Figure 5A:
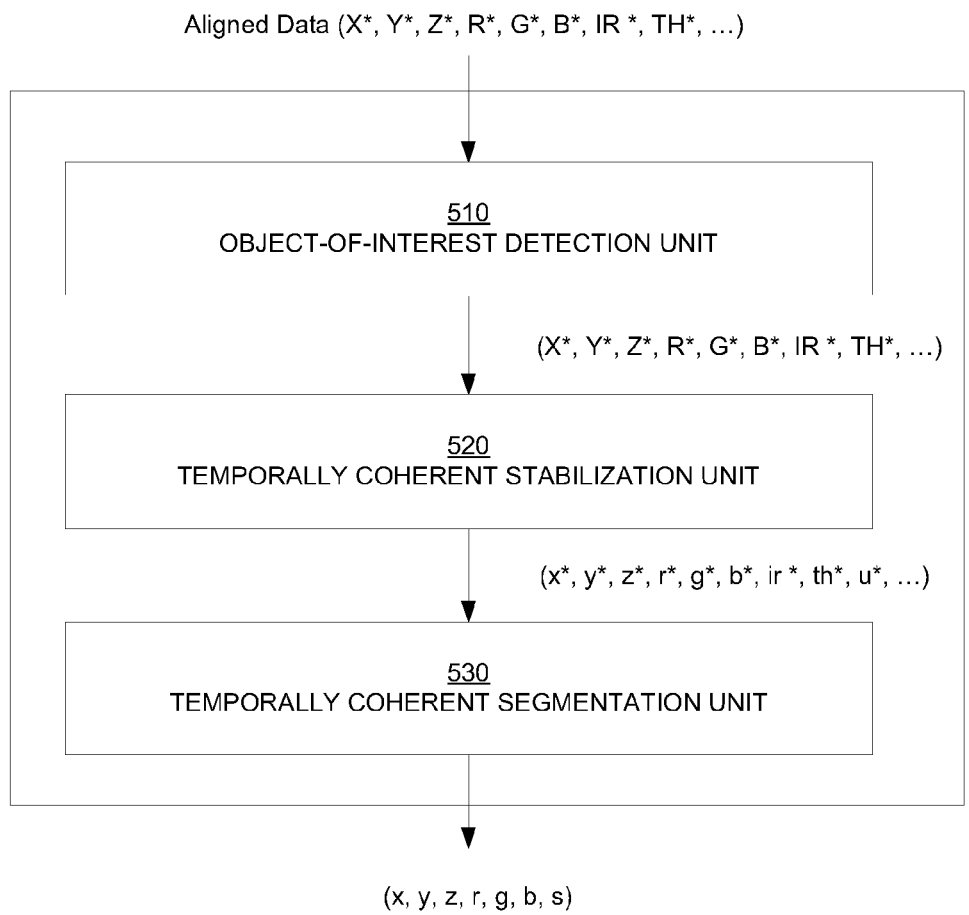
FIG. 5A is a block diagram of a RGB stabilization and segmentation system that is configured for performing temporally coherent RGBt segmentation, in accordance with one embodiment of the present disclosure.

In particular, FIG. 5A is a block diagram of a RGB stabilization and segmentation system 500A that is configured for performing temporally coherent RGBt segmentation, in accordance with one embodiment of the present disclosure. The object-of-interest detection unit 510 is configured to perform initial segmentation using auxiliary information from sensors of a second type. For instance, detection unit 510 may be comprised of a secondary object detection unit (e.g., depth system of FIG. 4) that is configured to identify an object-of-interest against a background in a corresponding image based on aligned data, thereby performing a crude segmentation process to generate an initial segmentation map.

The temporally coherent stabilization unit 520 is configured to perform temporal coherent stabilization, wherein motion and a history of mapping is considered on a pixel-by-pixel basis to refine the initial segmentation, and generate a refined segmentation map. That is, the initial segmentation map based on the auxiliary information is stabilized.

The temporally coherent segmentation unit 530 is configured to segment a corresponding image in the RGB domain, with respect to the auxiliary data, and with consideration of the temporal changes in RGB segmentation results. In particular, using the refined segmentation map as an initial point, RGB segmentation is performed. Temporally coherent stabilization is used to refine the RGB segmentation and generate a final segmentation mapping. That is, RGB segmentation is performed with respect to the auxiliary data and with consideration of the temporal changes in the RGB segmentation results.

Figure 5B:
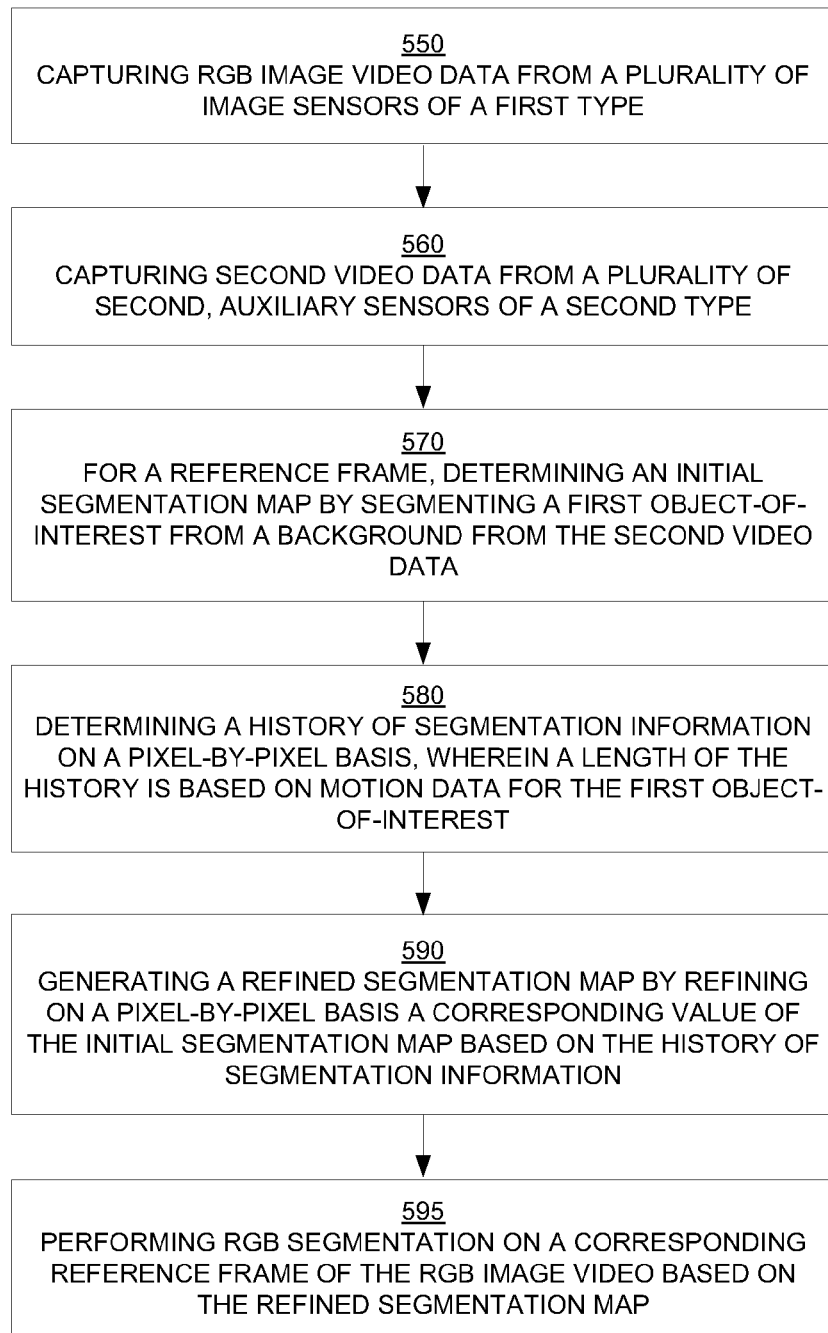
FIG. 5B is a flow chart illustrating steps in a method for performing video segmentation in two stages including performing temporally coherent segmentation of an initial segmentation map taken with second, auxiliary sensors, and using the initial segmentation map to perform temporally coherent segmentation of RGBt volumes, in accordance with one embodiment of the present disclosure

FIG. 5B is a flow chart 500B illustrating steps in a method for performing video segmentation in two stages including performing temporally coherent segmentation of an initial segmentation map taken with second, auxiliary sensors, and using the initial segmentation map to perform temporally coherent segmentation of RGBt volumes, in accordance with embodiments of the present disclosure. In other embodiments, the method outlined in FIG. 5B may be implemented as a computer-implemented method; or implemented as instructions within a computer system including a processor and memory configured to execute the instructions; or implemented as computer/processor executable instructions stored on a non-transitory computer-readable storage medium. The operations of FIG. 5B can be implemented within apparatus 100 and/or system 500A that are configured for performing video segmentation, in some embodiments of the present disclosure.

At 550, the method includes capturing RGB image video data from a plurality of image sensors of a first type, and at 560, capturing second, auxiliary video data from a plurality of second, auxiliary sensors of a second type. For example, image data of a first type may be RGB data, and image data of a second type may be depth map information.

At 570, the method includes determining for a reference frame an initial segmentation map by segmenting a first object-of-interest from a background based on the second video data (e.g., depth mapping information) $Z^*$. For example, the initial segmentation map may be performed by the object-of-interest detection unit 510. The initial segmentation map comprises an object label map $U^*$, which is the crude segmentation of the current frame into background and foreground. In one implementation, zeros in the object label map $U^*$ denote pixels associated with the background, and positive values and/or integers denote one or more objects-of-interest in the scene. Each object-of-interest can either be separately labeled by a unique integer value, or in another implementation the map $U^*$ can be binary, crudely decomposing the scene into background (zeros) and foreground for the objects-of-interest (ones). For purposes clarity and illustration only, embodiments are described with the map $U^*$ including binary values, but can support any value or range of values representing background and foreground.

Figure 6A:
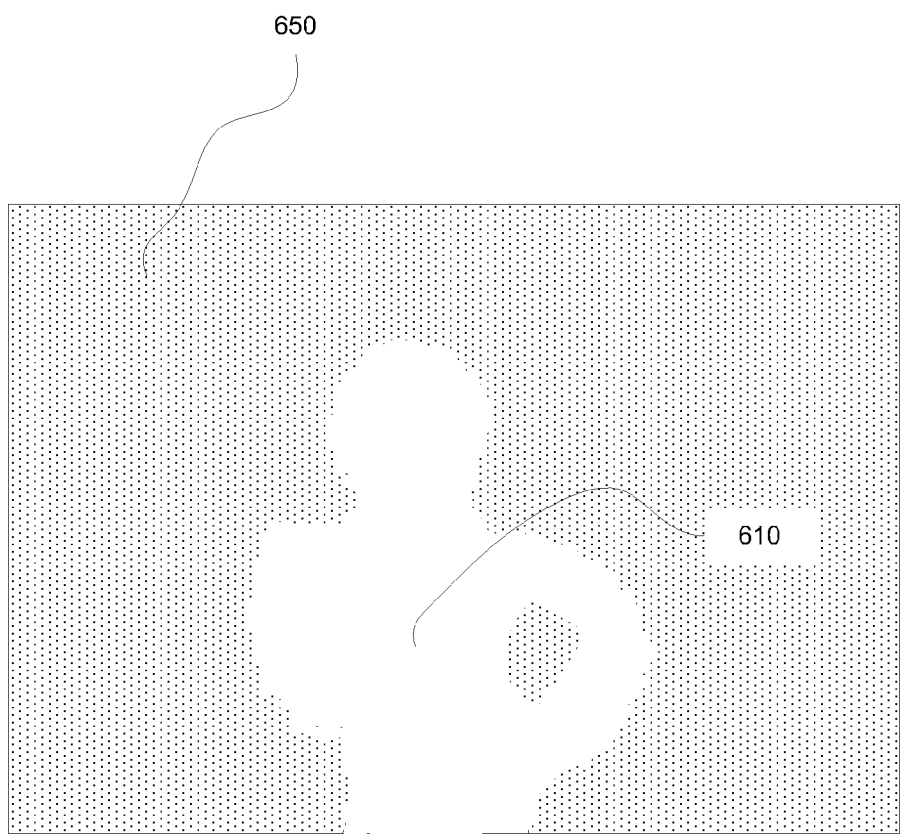
FIG. 6A is an illustration of an initial segmentation map generated from the depth map including the object of interest shown in FIG. 3B, in accordance with one embodiment of the present disclosure.

In one embodiment, when separate objects-of-interest are identified, the object label map $U^*$ can be decomposed into multiple object label binary maps $U^*_n$. Each of the object label maps $U^*_n$ can be treated in parallel and corresponding to a different object-of-interest. FIG. 6A is an illustration of an initial segmentation map 600A (e.g., $U^*$) generated from the depth map ($Z^*$). For example, initial segmentation map 600A includes the object-of-interest 310 (a standing person) previously shown in FIGS. 3A-B, and generated from depth mapping information. The foreground 610 is shown in white and denotes the pixels associated with a corresponding object-of-interest, whereas the dotted portions denotes the pixels associated with the background. Continuing with a previous example, foreground 610 may be a representation of object-of-interest 310 of FIGS. 3A-B.

At 580, the method includes determining a history of segmentation information on a pixel-by-pixel basis, wherein a length of the history is based on motion data for the object-of-interest (e.g., motion data for each pixel and/or an overall motion in the current frame). That is, a history of segmentation maps is collected. The segmentation maps in the history may include any segmentation map that is refined using the temporally coherent stabilization and segmentation process, and/or may include initial segmentation maps. For a selected pixel of a current frame, when considering historical data, the number of previous segmentation maps that are considered for a selected pixel when resolving noise and missing values depends on whether there is movement in that pixel.

At 590, the method includes generating a refined segmentation map by refining, on a pixel-by-pixel basis, the initial segmentation map based on the history of segmentation information. That is, for a selected pixel, a corresponding value of the initial segmentation is refined based on the history of segmentation information and/or corresponding motion information. For example, the temporally coherent stabilization unit 520 is configured to clean up the crude, initial segmentation map $U^*$ and remove as much of the noise as possible. This is accomplished by refining the current, initial segmentation map $U^*$ by using the current depth map $Z^*$, as well as information about the previous frames. A more detailed description of the processes employed by the temporally coherent stabilization unit 520 when executing 590 is provided in relation to FIG. 8.

At 595, the method includes performing RGB segmentation on a corresponding reference frame of the RGB image video based on the refined segmentation map. For example, the temporally coherent segmentation unit 530 is configured to generate a final segmentation map by performing RGB segmentation based on the refined segmentation map generated from secondary, auxiliary information. A more detailed description of the processes employed by the segmentation unit 530 is provided in relation to FIGS. 12 and 13.

Figure 8:
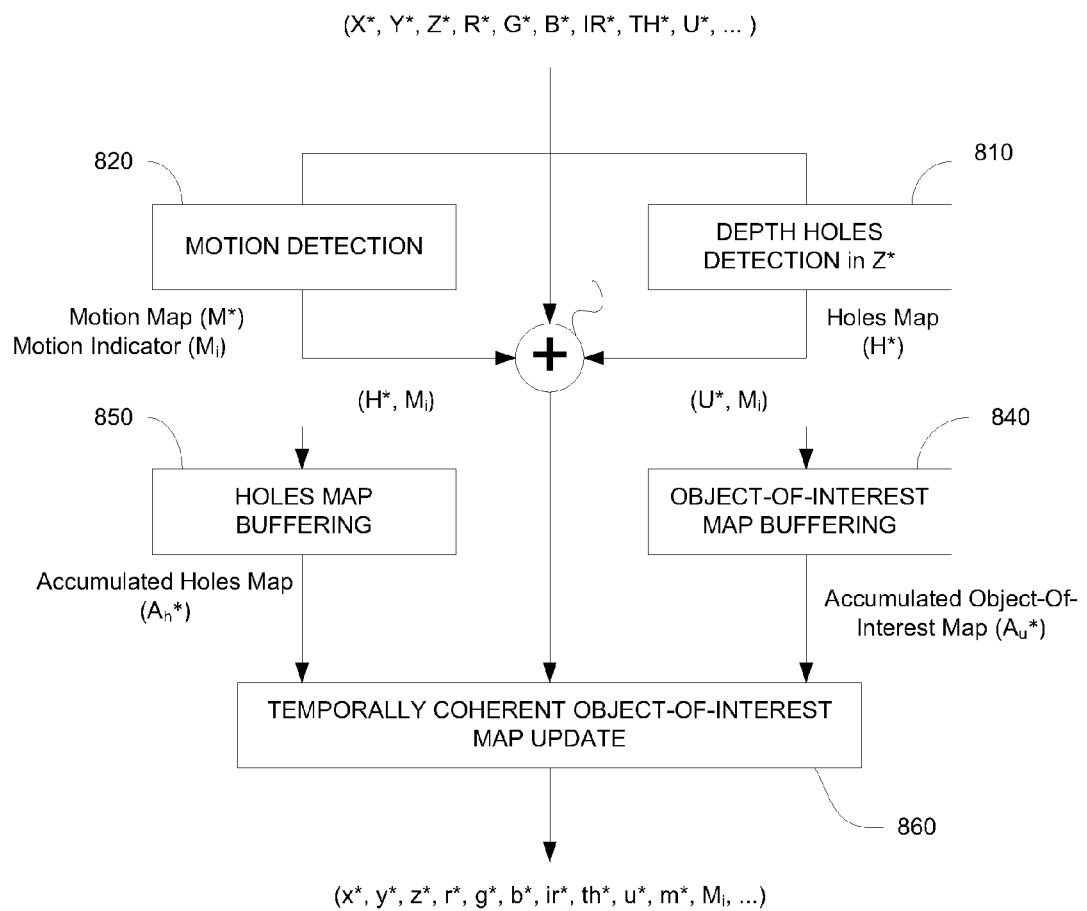
FIG. 8 is an information flow diagram illustrating the flow and generation of information in a first stage of the two-stage method outlined in FIG. 5B for performing video segmentation including performing temporally coherent segmentation of an initial segmentation map taken with second, auxiliary sensors, in accordance with one embodiment of the present disclosure.

FIG. 8 is an information flow diagram 800 illustrating the flow and generation of information in a first stage of the two-stage method outlined in FIG. 5B for performing video segmentation including performing temporally coherent segmentation of an initial segmentation map taken with second, auxiliary sensors, in accordance with one embodiment of the present disclosure. The process outlined in information flow diagram 800 may be implemented as a method; implemented as a computer-implemented method; implemented as instructions within a computer system including a processor and memory configured to execute the instructions; and/or implemented as computer/processor executable instructions stored on a non-transitory computer-readable storage medium. For example, the operations outlined in FIG. 8 can be implemented within apparatus 100 and/or the temporally coherent stabilization unit 520 of system 500A that are configured for performing video segmentation, in some embodiments of the present disclosure.

Information flow diagram 800 illustrates the stabilization of the initial segmentation mapping (e.g., object label map) generated from secondary, auxiliary information (e.g., depth mapping). That is, the initial segmentation or object label map is refined to remove noise and to resolve missing values (hereinafter referred to as "holes"). The object label map defines pixel locations of the object-of-interest and the background. More particularly, at 810 holes are generated in the depth map Z*, and their location are denoted in the binary holes map H* defining pixel location comprising missing values, which is of the same size as the depth map Z*. If the spatial indices are noted by (i, j), then the following relationship is defined in Equation 5, as follows:

$$H^*(i, j) = \begin{cases} 0 & Z^*(i, j) \neq 0 \\ 1, & Z^*(i, j) = 0 \end{cases} \quad (5)$$

Figure 6B:
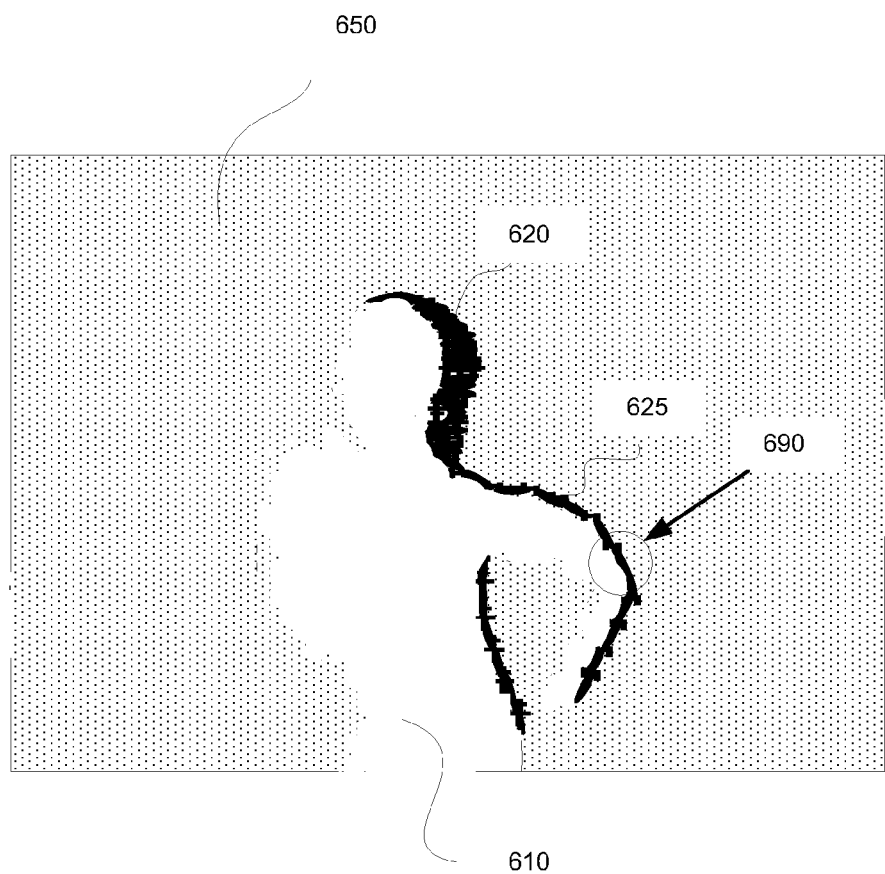
FIG. 6B is an illustration of the initial segmentation map of FIG. 6A overlaid with a holes map, in accordance with one embodiment of the present disclosure.
Figure 7A:
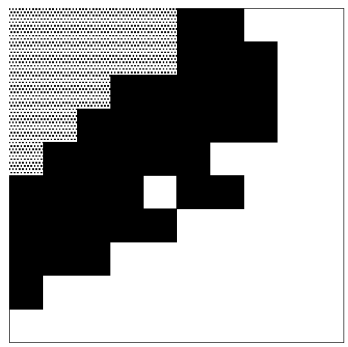
FIGS. 7(a)-(j) are illustrations of ten consecutive initial segmentation maps in a history that is taken of a boundary between an object-of-interest and a background, wherein the object-of-interest is not moving, and wherein the inconsistency in information (e.g., object-of-interest, background, and holes) from map-to-map shows the presence of random noise and random undefined values (holes) that contribute to unpleasant artifacts, such as, flickering, non-smooth boundaries, and omission of body parts, etc.
Figure 7D:
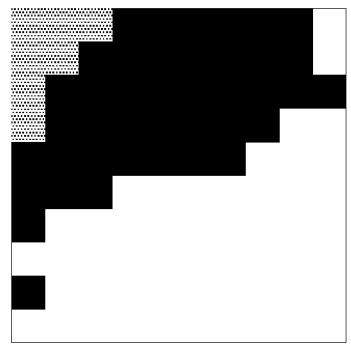
Figure 7B:
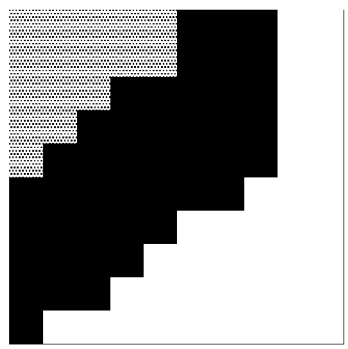
Figure 7E:
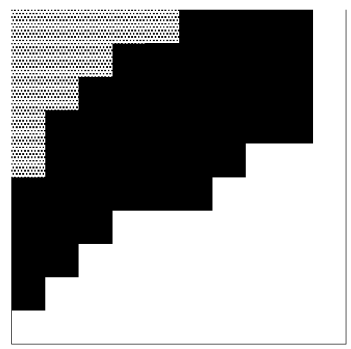
Figure 7C:
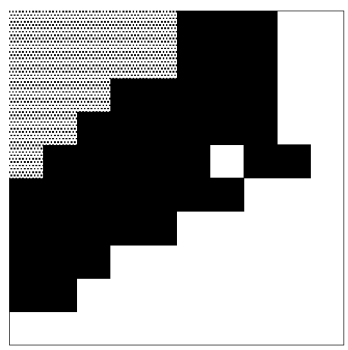
Figure 7F:
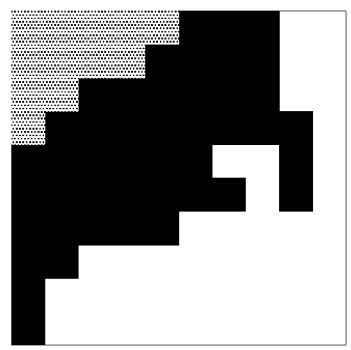
Figure 7I:
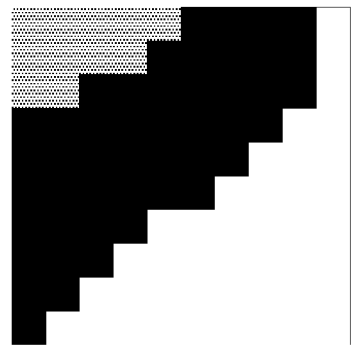
Figure 7H:
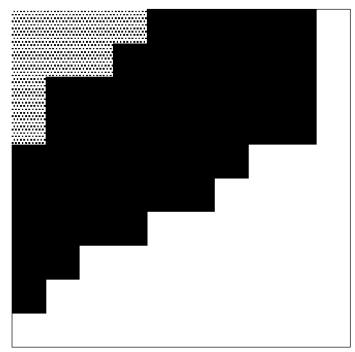
Figure 7J:
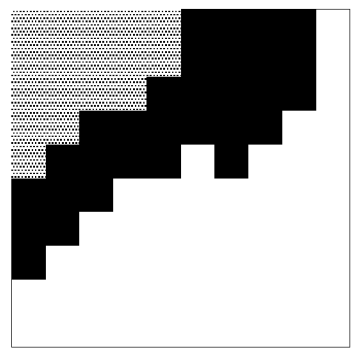
Figure 7G:
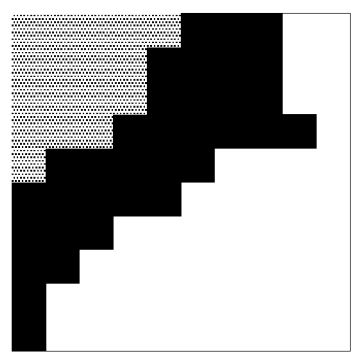

The effects of noise and missing information (as holes) manifested in the crude, initial segmentation map is shown in FIGS. 6B and 7(*a*)-(*j*). In particular, FIG. 6B is an illustration of a combined map 600B, wherein the initial segmentation map 600A of FIG. 6A that is overlaid with a holes map (the blackened areas), in accordance with one embodiment of the present disclosure. For instance, holes are generated on the right side of the boundary of the foreground 610 (e.g., object-of-interest), when viewing the map 6009, from the head region 620 and down the outside of the arm 625. In addition, holes are generated on the side of the torso of the object-of-interest 310.

Additionally, FIGS. 7(*a*)-(*j*) are illustrations of ten consecutive cells (e.g., 10×10 pixels) taken from initial segmentation maps overlaid with hole maps in a history that is taken of a boundary between a foreground 610 (e.g., identifying an object-of-interest 310) and a background 650 of a current frame in combined map 600B. For example, highlighted area 690 in map 600B shows the general area where the cell is located. In FIGS. 7(*a*)-(*j*), the object-of-interest is not moving. However, FIGS. 7(*a*)-(*j*) show how the resulting crude, initial segmentation map and maps change within the 10 cell history. That is, the patterns shown in FIGS. 7(*a*)-(*j*) are not consistent, or similar. The inconsistencies when identifying the object-of-interest in the foreground 610, background 650, and holes) from cell-to-cell in FIGS. 7(*a*)-(*j*) shows the presence of random noise and random undefined values (holes) that normally contribute to unpleasant artifacts, such as, flickering, non-smooth boundaries, and omission of body parts, etc. Embodiments of the present invention are able to use the information from the previous frames to enforce temporal coherence of the resulting initial segmentation maps, which will subsequently ensure temporally smooth input to the RGB segmentation.

At 820 in flow chart 800, motion is considered to determine any objects-of-interest are moving, or are stable. Motion is detected in the image, and the pixels that are in motion are marked in the binary motion map M*. Motion detection can be carried out using any number of techniques, such as, by looking at the differences between two or more consecutive frames in the crude user map U*; by looking at differences in consecutive RGB images; by looking at differences in depth values in consecutive frames; by detecting motion vectors; by looking at the differences in the IR or thermal domain, etc.

A motion indicator value $M_i$ is used to describe the degree of the motion. In one embodiment, $M_i$ is a binary value ("motion"-"no motion"). In another embodiment, $M_i$ is described using a discrete set of values (quantifying the degree of the motion as none, low, high etc.). In still another embodiment, $M_i$ can be a continuous value in a range, that can describe both the duration and the extent of the motion.

The motion and holes information is combined and used on a pixel-by-pixel basis at 830 to determine the degree of emphasis placed on corresponding historical information. In particular, to preserve the temporal information about the crude, initial segmentation (e.g., object-of-interest) map, as well as the holes in the depth maps, two buffers are used, which can hold up to some maximum, pre-defined number of frames, $L_{max}$. This maximum number of frames can be different between the different buffers, since they are storing different types of data. For example, holes map buffering is performed at 850 to store a history of holes maps H* that is based on the motion value $M_i$ for the selected pixel in the current frame. Also, object-of-interest (e.g., initial map segmentation) map buffering is performed at 840 to store a history of initial segmentation maps U* that is also based on the motion value $M_i$ for the selected pixel in the current frame.

An accumulated holes map ($A_h^*$) is generated based on the buffered holes maps H*. In one embodiment, the values in the history is weighted for a corresponding pixel. Also, an accumulated object-of-interest ($A_u^*$) is generated based on the buffered initial segmentation maps U*. At 860, the a refinement of the current, initial segmentation map is performed based on the current maps H* and U* and the temporal information contained in the accumulated holes map ($A_h^*$) and the accumulated object-of-interest ($A_u^*$). A more detailed description of refining the current, initial segmentation map is provided below in relation to FIG. 10.

Figure 9:
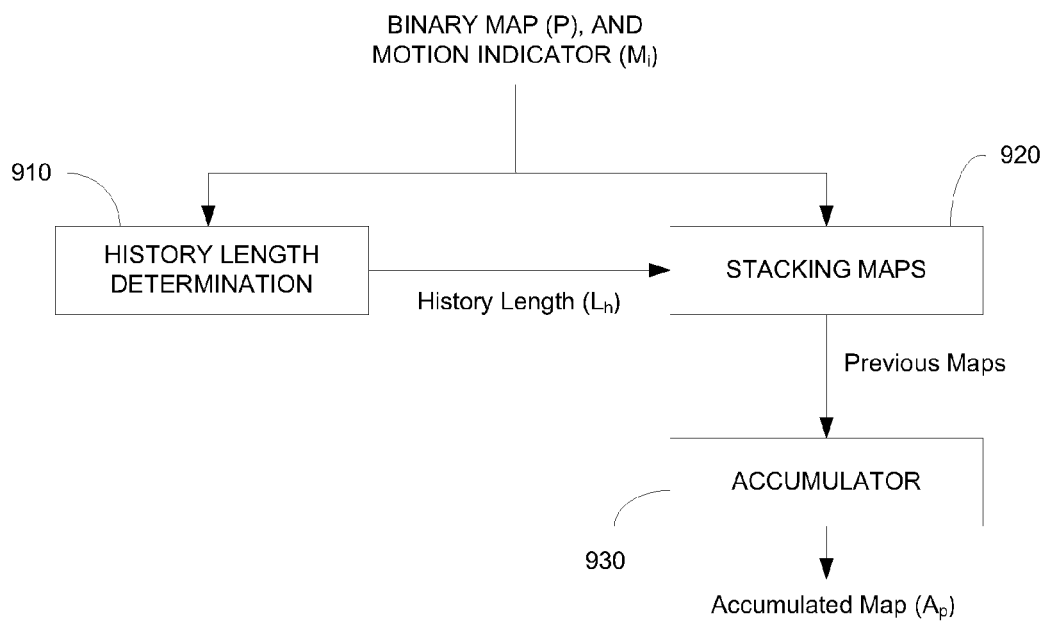
FIG. 9 is a flow chart illustrating steps in a method for buffering a history of initial segmentation maps, in accordance with one embodiment of the present disclosure.

FIG. 9 is a flow chart 900 illustrating steps in a method for buffering a history of initial segmentation maps U* and/or holes maps H*, in accordance with one embodiment of the present disclosure. The buffers receive a current binary map, put it on the map stack at 920, and read out an $L_h$ number of previous frames at 910. The value for $L_h$ is determined based on the motion indicator's value $M_i$, in one embodiment as previously described. In another embodiment, the value for $L_h$ can have a discrete value between 0 and $L_{max}$. The determination for the value of $L_h$ can be different for the different types of buffers and is defined in Equation 6, as follows:

$$L_h = f_H(M_i) \qquad (6)$$

At 930, the binary maps are accumulated, and the final output is the accumulated (e.g., summed) map $A_p$, which is no longer binary, but has discrete values between 0 and $L_h$. In one embodiment, the accumulating function can either do a simple summation of frames. In another embodiment, the accumulating function can assign different weights to maps, based on how long ago they occurred in the history. If the previous maps are denoted by $P_{t-i}$, with the current map designated as $P_t$, the following relationship is defined in Equation 7, as follows:

$$A_p = \Sigma_{i=1}^{L_h} w_i \cdot P^{t-i}, \text{ where } \Sigma_{i=1}^{L_h} w_i = L_h \qquad (7)$$

Figure 10:
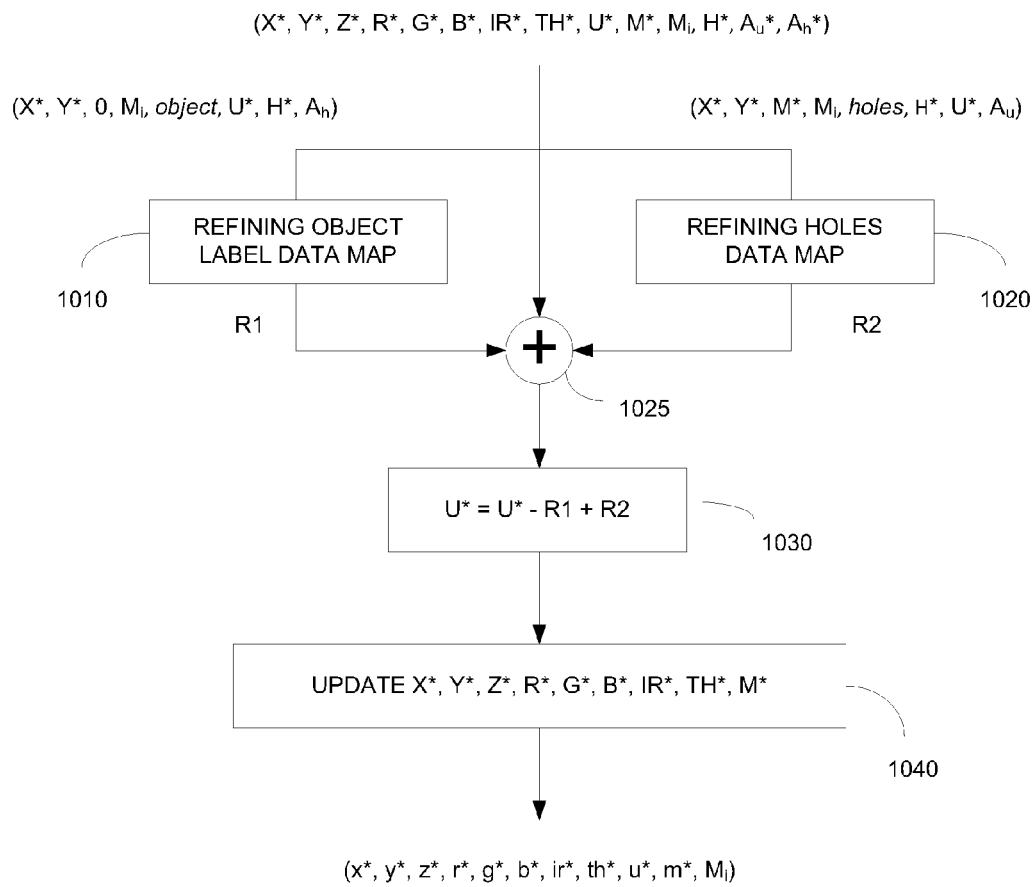
FIG. 10 is a flow chart illustrating steps in a method for generating the refined segmentation map that is used as an initial starting point when performing RGB segmentation, in accordance with one embodiment of the present disclosure.

FIG. 10 is a flow chart 1000 illustrating steps in a method for generating the refined segmentation map that is used as an initial starting point when performing RGB segmentation, in accordance with one embodiment of the present disclosure. The process outlined in information flow diagram 1000 may be implemented as a method; implemented as a computer-implemented method; implemented as instructions within a computer system including a processor and memory configured to execute the instructions; and/or implemented as computer/processor executable instructions stored on a non-transitory computer-readable storage medium. For example, the operations outlined in FIG. 10 can be implemented within apparatus 100 and/or the temporally coherent stabilization unit 520 of system 500A that are configured for performing video segmentation, in some embodiments of the present disclosure.

Since the main goal is to refine the binary object label map U*, a possible operation on the map is "pixel flipping," wherein a zero pixel can be turned into value of one, and vice versa. The pixels which can be "turned off" (e.g., changed from value one to value zero), are contained in the object label map U*. That is, pixels initially associated with an object-of-interest are thereafter determined to be associated with the background. In addition, the pixels which could be "turned on" (e.g., changed from value zero to value one) are contained in the holes map H*. That is, pixels initial associated with holes are thereafter determined to be associated with the object-of-interest.

Although the object label map U* is noisy, more confidence is placed in its values than the values generated in the holes map H*. That is, a pixel in the object label map U* having a value of one that is associated with the object-of-interest is assumed to be valid, and must pass a greater threshold to change its value. On the other hand, a pixel in the holes map H* represents locations for which the depth could not be determined by the system, and can pass a lower threshold than described above to assign to it a value of one, in association with the object-of-interest.

At 1010, the object label map U* is refined by finding pixels that are in the vicinity of undefined values (denoted c), and that historically have been undefined. That is, in the crude, initial segmentation map, the boundary between the object-of-interest and the background is examined. In particular, pixels assigned to the object-of-interest near the boundary is examined to determine whether any should be reassigned to the background. In particular, for a selected pixel in object label map comprising a value initially associated with the object-of-interest, the method includes determining that the value should be reassigned to be currently associated with the background when a number of values, in the history of segmentation information, each indicating an association with the background is above a threshold. As such, those pixels to be reassigned are changed from values of ones to zeros in R1, as their likelihood of representing a true object-of-interest pixel is not sufficiently high.

On the other hand, at 1020 if a pixel in the current frame has an undefined depth (e.g., hole), and satisfies certain condition, the likelihood of such pixel belonging to the object of interest is high and therefore the pixel is added to the object of interest map. In particular, for a selected pixel in the hole data map H* that is associated with a corresponding missing value, the method includes determining that the corresponding missing value is associated with a corresponding object-of-interest when a number of values, in the history of segmentation information, each indicating an association with the first object-of-interest is above a threshold. Correspondingly, the method determines that the corresponding missing value is associated with the background when the number of values is below the threshold. The conditions include the following: 1) is sufficiently close to pixels assigned to the object-of-interest; 2) in previous frames that pixel has been defined as being associated with the object-of-interest; and 3) that pixel has not been marked as a pixel in motion. As such, these newly assigned pixels are assigned a value of one in R2 and are associated with the object-of-interest.

At 1030, the pixels in the object label map U* are refined using the information included refined maps R1 and R2, and updated at 1040. As such, a refinement of the object label map U* (e.g., initial segmentation map) is performed based on the current maps H* and U* and the temporal information contained in the accumulated holes map ($A_h$*) and the accumulated object-of-interest ($A_u$*). That is temporal coherent stabilization on the object label map U* is performed, wherein motion and a history of mapping is considered on a pixel-by-pixel basis to refine the initial segmentation, and generate a refined segmentation map (x*, y*, z*, r*, g*, b*, ir*, th* u*, m*, $M_i$*).

At 1040, other variables are adjusted according to the refined segmentation map u*. For example, missing depth values may be filled in at locations whether the pixels were added to the crude, initial segmentation map or object label map U*, realigning of variables may be performed.

Figure 11:
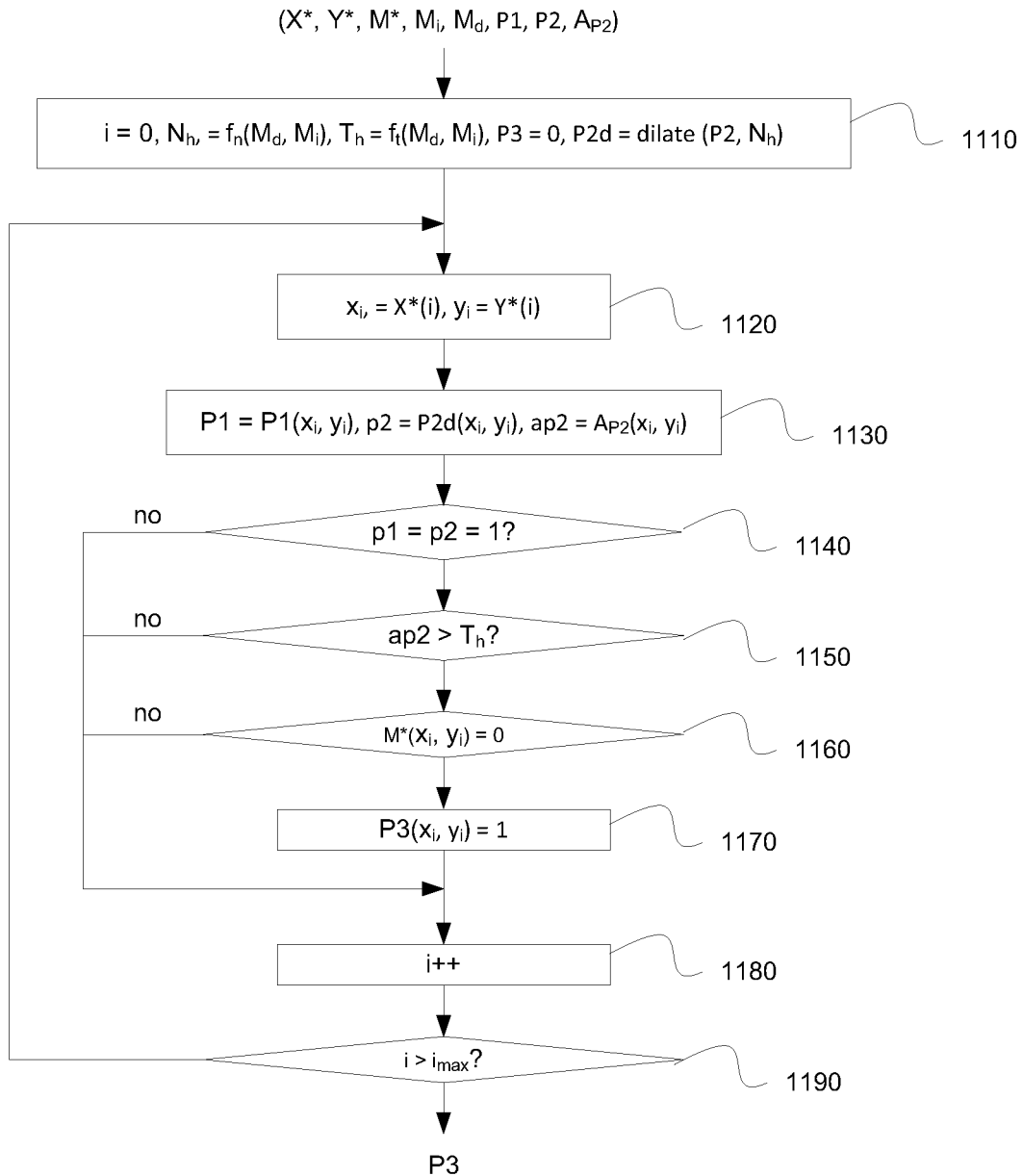
FIG. 11 is a flow chart illustrating more detailed steps in a method for generating the refined segmentation map that is used as an initial starting point when performing RGB segmentation, in accordance with one embodiment of the present disclosure.

FIG. 11 is a flow chart 1100 illustrating more detailed steps in a method for generating the refined segmentation map that is used as an initial starting point when performing RGB segmentation, in accordance with one embodiment of the present disclosure. The process outlined in information flow diagram 1100 may be implemented as a method; implemented as a computer-implemented method; implemented as instructions within a computer system including a processor and memory configured to execute the instructions; and/or implemented as computer/processor executable instructions stored on a non-transitory computer-readable storage medium. For example, the operations outlined in FIG. 11 can be implemented within apparatus 100 and/or the temporally coherent stabilization unit 520 of system 500A that are configured for performing video segmentation, in some embodiments of the present disclosure.

More specifically, flow chart 1100 illustrates the refinement of maps H* and U* previously discussed in relation to FIG. 10. The operations of turning the pixels on (from map H*) or off (from map U*) are symmetrical, thus both operations can be described by flow chart 1100. In one embodiment, when considering whether to reassign a pixel from value one to zero to turn off the pixel (from map U*), motion is not taken into account. The output of flow chart 1100 at 1190 is a binary map, denoted by P3, which indicates at which locations the flipping of the object-of-interest pixels should occur.

At 1110, various information is received as an input as described below. The received information includes spatial coordinates (X* and Y*), and information from the motion map M*. The motion map M* marks the pixels that are in motion in the current frame. Specifically, the motion indicator $M_i$ for each pixel in map M* describes the degree of the motion in the current frame. The motion indicator $M_i$ is used for calculating various thresholds, as previously described. The mode of operation $M_d$ determines whether the selected pixel in map P1 is considered to be turned off or on. The map P2 defines the neighborhoods in which to look for candidates (e.g., pixels) in map P1 that need updating. In addition, the history of P2 in the form of accumulated map $A_{P2}$ is also received. In one embodiment, the sets of locations for which P1=1 and P2=1 are disjointed. That is, pixels cannot be marked with 1's in both maps at the same time.

The size of the neighborhood in which the algorithm looks for candidates is determined by the motion indicator $M_i$, and this function can also depend on the mode of the operation, i.e. whether we are trying to find candidates for turning pixels off or on, as denoted by the input variable $M_d$. In the later stages, the mode input variable $M_d$ can have different values, which will subsequently select the appropriate mode of the operation of the functions for determining the neighborhood $N_h$ and threshold $T_h$.

In addition, the size of the neighborhood is used as one of the inputs for the map dilation. That is, the neighborhood size represents the size of the dilation kernel. The shape of the dilation kernel is determined before the system is put into operation. Various shapes are supported, to include a disc, a rectangle, or any other standard dilation kernel shape. Hence, for the size of the dilation kernel, the following relationship is defined in Equation 8, as follows:

$$N_h = f_n(M_d, M_i) \quad (8)$$

Additionally, it is necessary to define the threshold for determining whether the history of map P2 is long enough to have. This relationship is defined in Equation 9, as follows:

$$T_h = f_t(M_d, M_i) \quad (9)$$

For a selected pixel determined at 1120, map P2d is the dilated version of P2 at 1130. At 1140, the method goes through all the points in P1, looking for places where P1=1 and P2d=1. When this condition is satisfied, the method checks for two things, as follows: whether the value of P2 at that pixel location has been equal to 1 more than $T_h$ times in the previous $L_h$ frames at 1150, and whether that pixel is currently not in motion at 1160. That is, if the pixel is associated with motion, the object-of-interest is more than likely to be absent from that pixel, and the corresponding value should remain or be set to 0. When both of these conditions are met, such pixel is labeled as 1 in the resulting map P3 at 1170.

In one embodiment, the process for removing pixels from the crude object label map U* than the process of adding pixels to it. Thus, the thresholds in these two cases are set differently. For example, when considering whether to change a value in map U* from 1 to 0, only if in 5 or more of the previous frames the same pixel was active in the holes map H* will that pixel be removed from the crude object label map U*. On the other hand, when considering whether to add a pixel to the object-of-interest in map U* (e.g., based on the holes map H*), it can be enough that a pixel was 3 out of 9 times active in the crude object label map U* for it to be added to the refined segmentation map. The results of the two operations can be seen in Error! Reference source not found.: (a) represents the crude user map U*, in (b) are the pixels that should be removed from the crude user map, in (c) are the pixels that should be added to it, while the refined user map u* is given in (d).

Figure 12C:
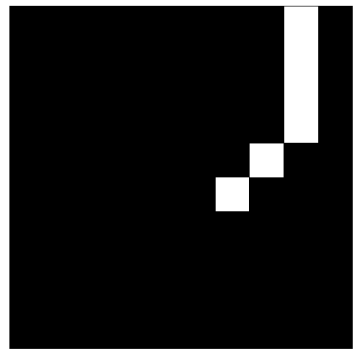
FIGS. 12(a)-(d) are illustrations of refining an initial segmentation or object label map, in accordance with one embodiment of the present disclosure.
Figure 12B:
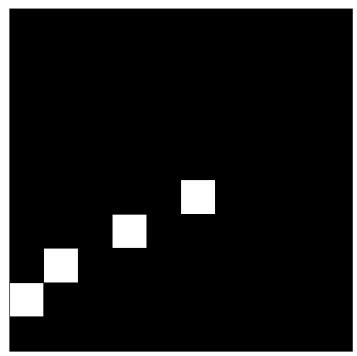
Figure 12D:
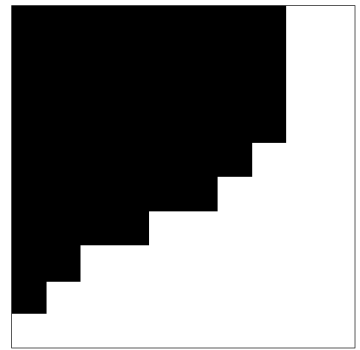
Figure 12A:
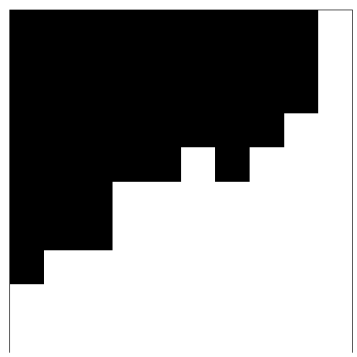

For example, FIGS. 12(a)-(d) are illustrations of refining an initial segmentation or object label map U* when considering whether to add or remove pixels, as detailed in FIG. 11, in accordance with one embodiment of the present disclosure. In particular, FIG. 12(a) represents the crude object label map U*. FIG. 12(b) illustrates the pixels (in white) that should be removed from the crude, object label map in refined map R1. FIG. 12 (c) illustrates the pixels (in white) that should be added to the crude, object label map in refined map R2. The refined object label map or refined segmentation map u*=U*-R1+R2 is given in FIG. 12(d).

Figure 13:
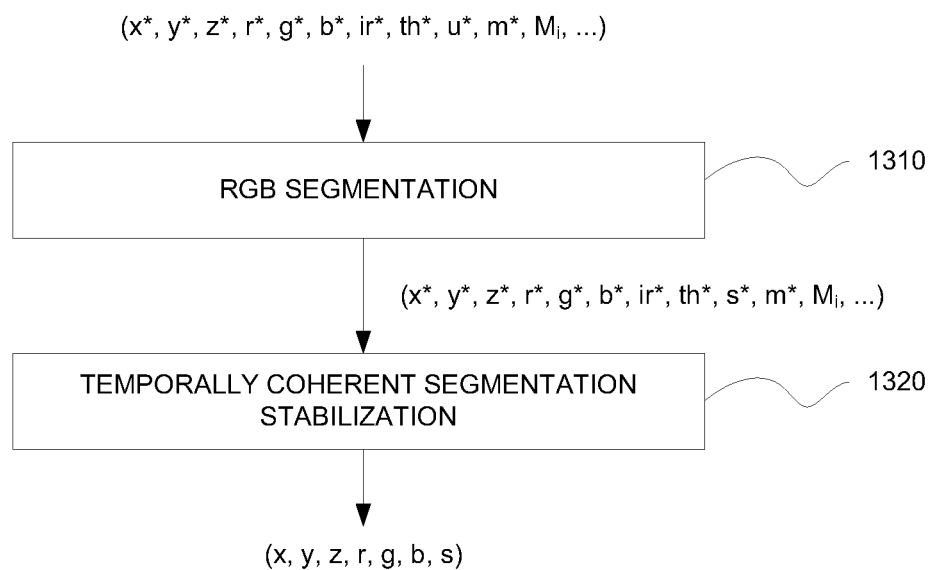
FIG. 13 is a flow chart illustrating steps in a final stage of a two-stage method of FIG. 5B for performing video segmentation including performing temporally coherent segmentation of RGBt volumes, in accordance with one embodiment of the present disclosure.

FIG. 13 is a flow chart 1300 illustrating steps in a final stage of a two-stage method of FIG. 5B for performing video segmentation including performing temporally coherent segmentation of RGBt volumes, in accordance with one embodiment of the present disclosure. The process outlined in information flow diagram 1300 may be implemented as a method; implemented as a computer-implemented method; implemented as instructions within a computer system including a processor and memory configured to execute the instructions; and/or implemented as computer/processor executable instructions stored on a non-transitory computer-readable storage medium. For example, the operations outlined in FIG. 13 can be implemented within apparatus 100 and/or the temporally coherent segmentation unit 530 of system 500A that are configured for performing video segmentation, in some embodiments of the present disclosure.

The values in the refined object label map or refined segmentation map u*=U*-R1+R2 may be updated to adjust various values. For example, the missing depth values may be filled in at locations where the pixels were added to the crude object label map U* by taking the average of valid values from the locations that were labeled as object-of-interest pixels in U*. When updating, a re-aligning of the variables may occur, based on the differences between U* and u*. Thus, this updating relationship can be defined in form of an updating function $T_u$ of the input variables with U* and u* as parameters, as follows in Equation 10:

$$(x^*, y^*, z^*, r^*, g^*, b^*, ir^*, th^*, m^*) = T_u(X^*, Y^*, Z^*, R^*, G^*, B^*, IR^*, TH^*, M^*; U^*, u^*) \quad (10)$$

At 1310, the refined segmentation map with the updated set of variables (x*, y*, z*, r*, g*, b*, ir*, th*, u*, m*, $M_i$) is used as the starting map when performing RGB segmentation. As such, the refined segmentation map refined user map u* utilizing the texture information contained in (r*, g*, b*). The RGB segmentation can be performed using one of the many already known methods, such as the watershed, mean-shift, Canny edge detection or any other algorithm that will be able to provide binary segmentation map s* which denotes foreground and background pixels.

However, the refined segmentation map u* provides guides for such RGB algorithms, as it represents the initial segmentation of the texture image that further needs to be refined (and not completely changed) in the RGB domain. Thus, in one embodiment since the final segmentation should be binary, only two segments need to be determined. A key thing to note here is that because this is a refinement of the input segmentation, as opposed to carrying out the RGB segmentation on the entire image data, this RGB segmentation operation at 1310 can be performed quickly.

The area of refinement around u* can be defined as being a function of other parameters, for example, the motion map m* and motion indicator $M_i$. Therefore, obtaining s* can be formulated as a function whose input is initial segmentation u*, while the parameters steering this refinement are the texture data (r*, g*, b*) and motion data m* and $M_i$. The binary segmentation map can be defined in Equation 11, as follows:

$$s^* = T_{refine}(u^*; r^*, g^*, b^*, m^*, M_i) \quad (11)$$

Examples of motion dependency include variable sizes of the refinement areas based on both local motion, represented in m*, and global motion, described by $M_i$. This function can be such that, in cases of no motion or low motion, the refinement area is tight around the refined user map u*, since more confidence can be placed on its initial result and the position of the objects-of-interest within the scene.

On the other hand, in cases of high motion, the refinement area may be set to cover more pixels to reduce error. That is, fast motion can result in effectively different position of body parts or other objects of interest in different types of data. Increasing the refinement area allows the RGB segmentation to be able to compensate for possible misalignment of texture (RGB) and other data, in systems where the data is captured in series (as opposed to in parallel). However, the area has to remain small enough for the process to be executed in real time. Thus, there is a trade-off between accuracy and speed, when fast motion is present in the image.

At 1320, the final output is obtained by enforcing temporal coherence to the segmentation map s*. Depending on the choice of the RGB segmentation process, it can be more or less susceptible to the variations in the initial segmentation u*. Therefore, it is necessary to enforce additional checking of the segmentation, in order to provide the smoothest, least flickering results.

Figure 14:
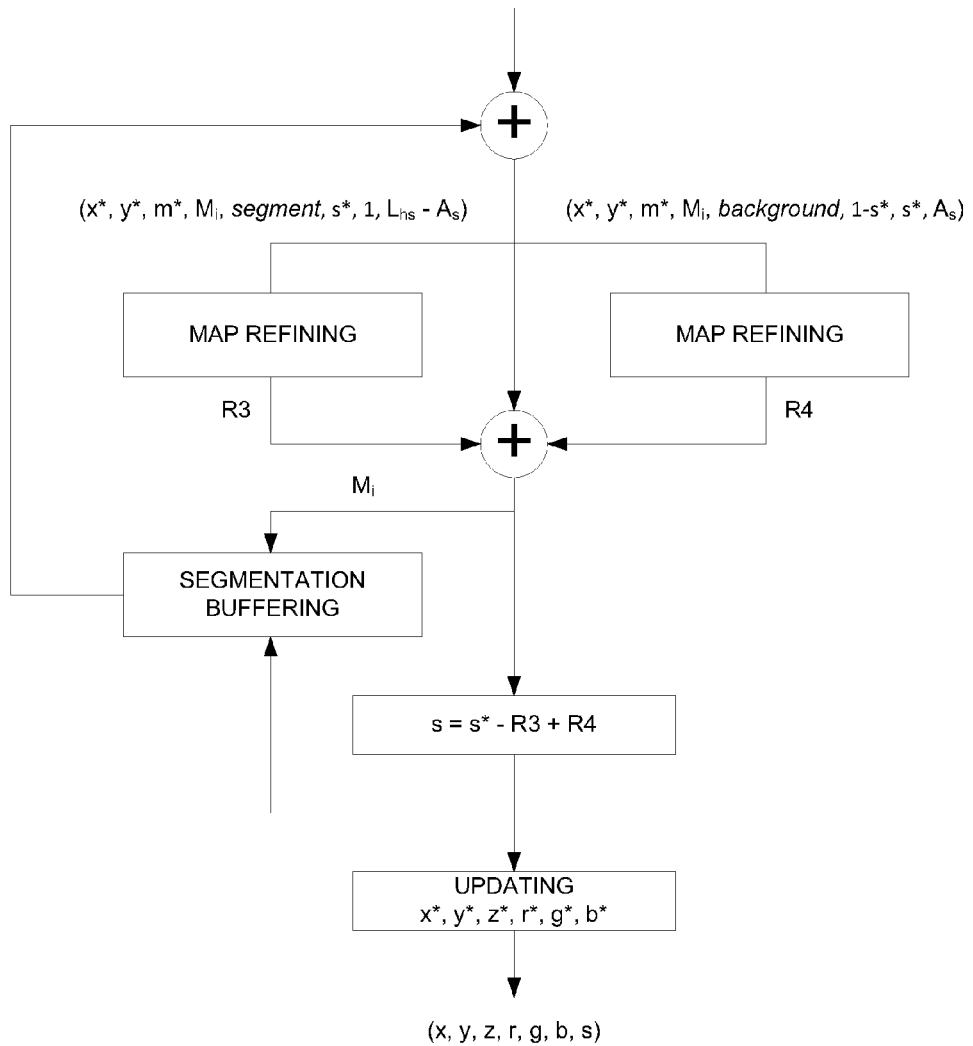
FIG. 14 is a flow chart illustrating more detailed steps in the final stage of a two-stage method of FIG. 12 for performing video segmentation including performing temporally coherent segmentation of RGBt volumes, in accordance with one embodiment of the present disclosure.

FIG. 14 is a flow chart 1400 illustrating more detailed steps in the final stage of a two-stage method of FIG. 12 for performing video segmentation including performing temporally coherent segmentation of RGBt volumes, in accordance with one embodiment of the present disclosure. The process outlined in information flow diagram 1400 may be implemented as a method; implemented as a computer-implemented method; implemented as instructions within a computer system including a processor and memory configured to execute the instructions; and/or implemented as computer/processor executable instructions stored on a non-transitory computer-readable storage medium. For example, the operations outlined in FIG. 14 can be implemented within apparatus 100 and/or the temporally coherent segmentation unit 530 of system 500A that are configured for performing video segmentation, in some embodiments of the present disclosure.

The operations outlined flow chart 1400 for performing temporally coherent segmentation of RGBt volumes is similar to performing temporally coherent stabilization in flow chart 1000 of FIG. 10 that is performed by the stabilization unit 520 of FIG. 5A. A notable difference between the two operations lies in the fact the buffer does not store the penultimate result map s*, but rather the final output s. That is, the final output shown to the user needs to be temporally stable and coherent. This may be accomplished at the expense of segmentation accuracy, i.e. allowing for certain errors to propagate, under the assumption that it is less disturbing to the viewer to have a consistent but less-than-perfect segmentation than an inconsistent, flickering result. This type of problem may, for example, occur around user's hair, where there is significant flickering of the segmentation in cases where the hair is not sleek and smooth and thus the initial crude segmentation maps U* can vary significantly between the frames (which is not always corrected in u* or s*), or when the patterned foreground and/or background (examples of which include colorful and patterned clothing, or stationary, busy backgrounds) that are sufficiently close to the object-of-interest.

To minimize the flickering of the final output, pixels may be added to or removed from the segmentation map s*. The candidates to be removed are all the pixels in s* equal to 1, and the ones that have historically been labeled as background in s, are flipped to 0. The pixels in the vicinity of the object of interest in s* are candidates for being added to the final segmentation map. Again, those pixels have to have been historically equal to 1 in the final segmentation map s* in order to be added to the current one.

In one embodiment, the functions for choosing the thresholds for determining whether the history has been long enough, $T_{h3}$ and $T_{h4}$, depend on the modes of operations, namely, segment and background, which have different outputs for the same motion indicator $M_i$ than when performing stabilization of the initial object label map (e.g., initial segmentation map), where the modes were object and holes. Temporal filtering may be chosen to be more, or less aggressive at this final stage of operation, as the global movement described by the motion indicator $M_i$ can impact greatly the final output presented to the target user. In cases of low or no motion, a human user can detect a lot more artifacts such as flickering, unsmooth boundaries etc. as opposed to the videos of high motion.

Before sending the final output to the target user, the system may update the position and texture data. For example, in cases where bandwidth is of concern, the updating process may only keep the RGB and position values for the pixels that are marked as object-of-interest and removing the rest (or marking the rest with zeros), thus saving the bandwidth needed to transmit the data. The updating process may also realign the data, in order to conform to the output coordinate system. The output is sent in the form of position, texture, and object-of-interest data as: (x, y, z, r, g, b, s).

Thus, according to embodiments of the present disclosure, systems and methods are described providing for performing video segmentation including performing temporally coherent segmentation on segmentation maps generated from two different types of sensors.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments.

The invention claimed is:

1. An apparatus for performing video segmentation, comprising:
   a plurality of image sensors of a first type;
   a plurality of second, auxiliary sensors of a second type;
   a processor executing computer-executable instructions stored in memory the instructions including:
      capturing red, green, and blue (RGB) image video data from the plurality of image sensors of the first type;
      capturing second video data from the plurality of second, auxiliary sensors of the second type;
      determining, for a reference frame, an initial segmentation map by segmenting a first object-of-interest from a background from the second video data;
      determining a history of segmentation information on a pixel-by-pixel basis, wherein a length of the history is based on motion data for the first object-of-interest;
      generating a refined segmentation map by refining on a pixel-by-pixel basis a corresponding value of the initial segmentation map based on the history of segmentation information;
      performing RGB segmentation on a corresponding reference frame of the RGB image video data based on the refined segmentation map; and
      performing segmentation of a second object-of-interest by:
         determining, for the reference frame, a second initial segmentation map by segmenting the second object-of-interest from a background from the second video data;
         generating a second refined segmentation map comprising the second object-of-interest by refining on a pixel-by-pixel basis a corresponding value of the initial segmentation map based on the history of segmentation information; and
         performing RGB segmentation on a corresponding reference frame of the RGB image video based on the second refined segmentation map.

2. The apparatus of claim 1, wherein the refining on a pixel-by-pixel basis a corresponding value of the initial segmentation map in the instructions executed by the processor comprises:
   determining, for a particular image frame, an object label data map defining pixel locations of the first object-of-interest and pixel locations of the background;
   determining, for the particular image frame, a hole data map defining pixel locations comprising missing values;
   determining, for a first pixel in the hole data map associated with a corresponding missing value, that the corresponding missing value is associated with the first object-of-interest when a number of values in the history of segmentation information indicating an association with the first object-of-interest is above a threshold; and
   determining, for the first pixel, that the corresponding missing value is associated with the background when the number of values is below the threshold.

3. The apparatus of claim 1, wherein the refining on a pixel-by-pixel basis a corresponding value of the initial segmentation map in the instructions executed by the processor comprises:
   determining, for a particular image frame, an object label data map defining pixel locations of the first object-of-interest and pixel locations of the background;
   determining, for the particular image frame, a hole data map defining pixel locations comprising missing values; and
   determining, for a first pixel in the object label data map comprising a value initially associated with the first object-of-interest, that the value is currently associated with the background when a number of values in the history of segmentation information indicating an association with the background is above a threshold.

4. The apparatus of claim 1, wherein the instructions executed by the processor further comprises calibrating the plurality of image sensors and the plurality of second, auxiliary sensors to spatially align at least one common point in a unified coordinate system.

5. The apparatus of claim 1, wherein the second, auxiliary sensors are taken from a group consisting of depth sensors associated with depth data maps, thermal sensors associated with thermal data maps, infrared sensors associated with infrared data maps, and time-of-flight sensors associated with time-of-flight data maps.

6. The apparatus of claim 1, wherein the instructions performed by the processor further comprises weighting values in the history of segmentation information of a corresponding pixel based on the motion data.

7. A method for refining segmentation of objects from video by considering historical segmentation values and motion, comprising:
   capturing red, green, and blue (RGB) image video data from a plurality of image sensors of a first type;

capturing second video data from a plurality of second, auxiliary sensors of a second type;
determining, for a reference frame, an initial segmentation map by segmenting a first object-of-interest from a background from the second video data;
determining a history of segmentation information on a pixel-by-pixel basis, wherein a length of the history is based on motion data for the first object-of-interest;
generating a refined segmentation map by refining on a pixel-by-pixel basis a corresponding value of the initial segmentation map based on the history of segmentation information;
performing RGB segmentation on a corresponding reference frame of the RGB image video data based on the refined segmentation map; and
performing segmentation of a second object-of-interest by:
determining, for the reference frame, a second initial segmentation map by segmenting the second object-of-interest from a background from the second video data;
generating a second refined segmentation map comprising the second object-of-interest by refining on a pixel-by-pixel basis a corresponding value of the initial segmentation map based on the history of segmentation information; and
performing RGB segmentation on a corresponding reference frame of the RGB image video based on the second refined segmentation map.

8. The method of claim 7, wherein the refining on a pixel-by-pixel basis a corresponding value of the initial segmentation map comprises:
determining, for a particular image frame, an object label data map defining pixel locations of the first object-of-interest and pixel locations of the background;
determining, for the particular image frame, a hole data map defining pixel locations comprising missing values;
determining, for a first pixel in the hole data map associated with a corresponding missing value, that the corresponding missing value is associated with the first object-of-interest when a number of values in the history of segmentation information indicating an association with the first object-of-interest is above a threshold; and
determining, for the first pixel, that the corresponding missing value is associated with the background when the number of values is below the threshold.

9. The method of claim 7, wherein the refining on a pixel-by-pixel basis a corresponding value of the initial segmentation map comprises:
determining, for a particular image frame, an object label data map defining pixel locations of the first object-of-interest and pixel locations of the background;
determining, for the particular image frame, a hole data map defining pixel locations comprising missing values; and
determining, for a first pixel in the object label data map comprising a value initially associated with the first object-of-interest, that the value is currently associated with the background when a number of values in the history of segmentation information indicating an association with the background is above a threshold.

10. The method of claim 9, wherein the first pixel is within a neighborhood of a border between the first object-of-interest and the background based on the motion data.

11. The method of claim 7, further comprising calibrating the plurality of image sensors and the plurality of second, auxiliary sensors to spatially align at least one common point in a unified coordinate system.

12. The method of claim 7, wherein the second, auxiliary sensors are taken from a group consisting of depth sensors associated with depth data maps, thermal sensors associated with thermal data maps, infrared sensors associated with infrared data maps, and time-of-flight sensors associated with time-of-flight data maps.

13. The method of claim 7, further comprising weighting values in the history of segmentation information of a corresponding pixel based on the motion data.

14. A computer system for performing video segmentation, comprising:
memory having stored therein computer-executable instructions; and
a processor executing the computer-executable instructions including:
capturing red, green, and blue (RGB) image video data from a plurality of image sensors of a first type;
capturing second video data from a plurality of second, auxiliary sensors of a second type;
determining, for a reference frame, an initial segmentation map by segmenting a first object-of-interest from a background from the second video data;
determining a history of segmentation information on a pixel-by-pixel basis, wherein a length of the history is based on motion data for the first object-of-interest;
generating a refined segmentation map by refining on a pixel-by-pixel basis a corresponding value of the initial segmentation map based on the history of segmentation information;
performing RGB segmentation on a corresponding reference frame of the RGB image video data based on the refined segmentation map; and
performing segmentation of a second object-of-interest by:
determining, for the reference frame, a second initial segmentation map by segmenting the second object-of-interest from a background from the second video data;
generating a second refined segmentation map comprising the second object-of-interest by refining on a pixel-by-pixel basis a corresponding value of the initial segmentation map based on the history of segmentation information; and
performing RGB segmentation on a corresponding reference frame of the RGB image video based on the second refined segmentation map.

15. The computer system of claim 14, wherein the refining on a pixel-by-pixel basis a corresponding value of the initial segmentation map in the instructions executed by the processor, comprises:
determining, for a particular image frame, an object label data map defining pixel locations of the first object-of-interest and pixel locations of the background;
determining, for the particular image frame, a hole data map defining pixel locations comprising missing values;
determining, for a first pixel in the hole data map associated with a corresponding missing value, that the corresponding missing value is associated with the first object-of-interest when a number of values in the history of segmentation information indicating an association with the first object-of-interest is above a threshold; and
determining, for the first pixel, that the corresponding missing value is associated with the background when the number of values is below the threshold.

16. The computer system of claim 14, wherein the refining on a pixel-by-pixel basis a corresponding value of the initial segmentation map in the instructions executed by the processor, comprises:
- determining, for a particular image frame, an object label data map defining pixel locations of first object-of-interest and pixel locations of the background;
- determining, for the particular image frame, a hole data map defining pixel locations comprising missing values; and
- determining, for a first pixel in the object label data map comprising a value initially associated with the first object-of-interest, that the value is currently associated with the background when a number of values in the history of segmentation information indicating an association with the background is above a threshold.

17. The computer system of claim 14, wherein the instructions executed by the processor further comprises calibrating the plurality of image sensors and the plurality of second, auxiliary sensors to spatially align at least one common point in a unified coordinate system.

18. The computer system of claim 14, wherein the second, auxiliary sensors are taken from a group consisting of depth sensors associated with depth data maps, thermal sensors associated with thermal data maps, infrared sensors associated with infrared data maps, and time-of-flight sensors associated with time-of-flight data maps.

* * * * *